(12) United States Patent
Seitz et al.

(10) Patent No.: US 9,066,523 B2
(45) Date of Patent: Jun. 30, 2015

(54) METHOD AND APPARATUS FOR DIRECTING STEAM DISTRIBUTION IN A STEAM COOKER

(75) Inventors: Craig A. Seitz, Decatur, IN (US); Lawrence R. Wolf, Avilla, IN (US)

(73) Assignee: ACCUTEMP PRODUCTS, INC., Fort Wayne, IN (US)

( * ) Notice: Subject to any disclaimer, the term of this patent is extended or adjusted under 35 U.S.C. 154(b) by 655 days.

(21) Appl. No.: 12/689,512

(22) Filed: Jan. 19, 2010

(65) Prior Publication Data
US 2010/0199860 A1 Aug. 12, 2010

Related U.S. Application Data

(60) Provisional application No. 61/145,598, filed on Jan. 19, 2009.

(51) Int. Cl.
*A47J 27/04* (2006.01)
*A21B 3/04* (2006.01)

(52) U.S. Cl.
CPC ........................................ *A21B 3/04* (2013.01)

(58) Field of Classification Search
CPC .......... A47J 27/04; A47J 27/002; A47J 27/08
USPC ......................................................... 99/468
See application file for complete search history.

(56) References Cited

U.S. PATENT DOCUMENTS

| 1,344,326 | A | 6/1920 | Williams |
| 1,740,205 | A | 12/1929 | Schmidt |
| 3,212,426 | A | 10/1965 | Lewus |
| 3,289,571 | A | 12/1966 | Lewus |
| 3,357,342 | A | 12/1967 | Dreyfus |
| 3,398,721 | A * | 8/1968 | Zangl ............................. 122/33 |
| 3,604,895 | A | 9/1971 | MacKay |
| 3,820,524 | A | 6/1974 | Buckell |
| 4,084,080 | A | 4/1978 | McMahan |
| 4,173,215 | A | 11/1979 | Bureau et al. |

(Continued)

FOREIGN PATENT DOCUMENTS

JP           55-126742           9/1980

OTHER PUBLICATIONS

Southbend Owners Manual, "StratoSteam Countertop Steamer", Oct. 2008.

(Continued)

*Primary Examiner* — Melba Bumgarner
*Assistant Examiner* — Amir Klayman
(74) *Attorney, Agent, or Firm* — Faegre Baker Daniels LLP

(57) ABSTRACT

The present invention relates to a method and apparatus for directing steam distribution in a steam cooker. In one exemplary embodiment, steam is directed through a steam cooker by a plenum that is in fluid communication with a steam chamber. As steam is generated within the steam chamber, the steam fills the chamber where it is directed to the plenum. In one exemplary embodiment, the plenum is formed to extend vertically along an interior wall of the steam cooker. In one exemplary embodiment, the plenum is defined between an interior wall of the steam cooker and a steam distributor that has a plurality of openings formed therein. The openings in the steam distributor allow for steam rising within the plenum to exit into the cooking chamber by passing through the openings. A pressure switch may be utilized to turn off the steam generator in the steam cooker.

14 Claims, 17 Drawing Sheets

(56) References Cited

U.S. PATENT DOCUMENTS

| | | | |
|---|---|---|---|
| 4,460,822 A * | 7/1984 | Alden et al. | 219/401 |
| 4,506,598 A | 3/1985 | Meister | |
| 4,509,412 A | 4/1985 | Whittenburg et al. | |
| 4,574,776 A | 3/1986 | Hidle | |
| 4,583,998 A * | 4/1986 | Reid et al. | 95/253 |
| 4,823,766 A | 4/1989 | Violi | |
| 4,823,767 A * | 4/1989 | Wust | 126/20 |
| 4,897,525 A | 1/1990 | Hirsch | |
| 5,230,368 A * | 7/1993 | Berfield | 137/889 |
| 5,235,903 A | 8/1993 | Tippmann | |
| 5,280,748 A * | 1/1994 | Pardo | 99/330 |
| 5,318,792 A | 6/1994 | Tippmann | |
| 5,368,008 A | 11/1994 | Oslin | |
| 5,530,223 A | 6/1996 | Culzoni et al. | |
| 5,640,946 A | 6/1997 | Oslin | |
| 5,732,614 A | 3/1998 | Oslin | |
| 5,768,982 A | 6/1998 | Violi et al. | |
| 5,869,812 A | 2/1999 | Creamer et al. | |
| 5,968,388 A | 10/1999 | Creamer | |
| 6,000,392 A | 12/1999 | Stritzl et al. | |
| 6,023,050 A | 2/2000 | Violi | |
| 6,107,605 A | 8/2000 | Creamer et al. | |
| 6,175,100 B1 * | 1/2001 | Creamer et al. | 219/401 |
| 6,446,646 B1 * | 9/2002 | Izumi | 134/66 |
| 6,453,802 B1 | 9/2002 | Manganiello et al. | |
| 7,049,551 B2 | 5/2006 | Williams et al. | |
| 2003/0178411 A1 * | 9/2003 | Manganiello et al. | 219/496 |
| 2004/0187700 A1 | 9/2004 | Tippmann | |
| 2006/0096970 A1 * | 5/2006 | Yang et al. | 219/401 |

OTHER PUBLICATIONS

Non-Final Office Action dated Jun. 30, 2005 in U.S. Appl. No. 10/808,954 together with Response to Office Action dated Oct. 31, 2005.

Final Office Action dated Jan. 18, 2006 in U.S. Appl. No. 10/808,954.

\* cited by examiner

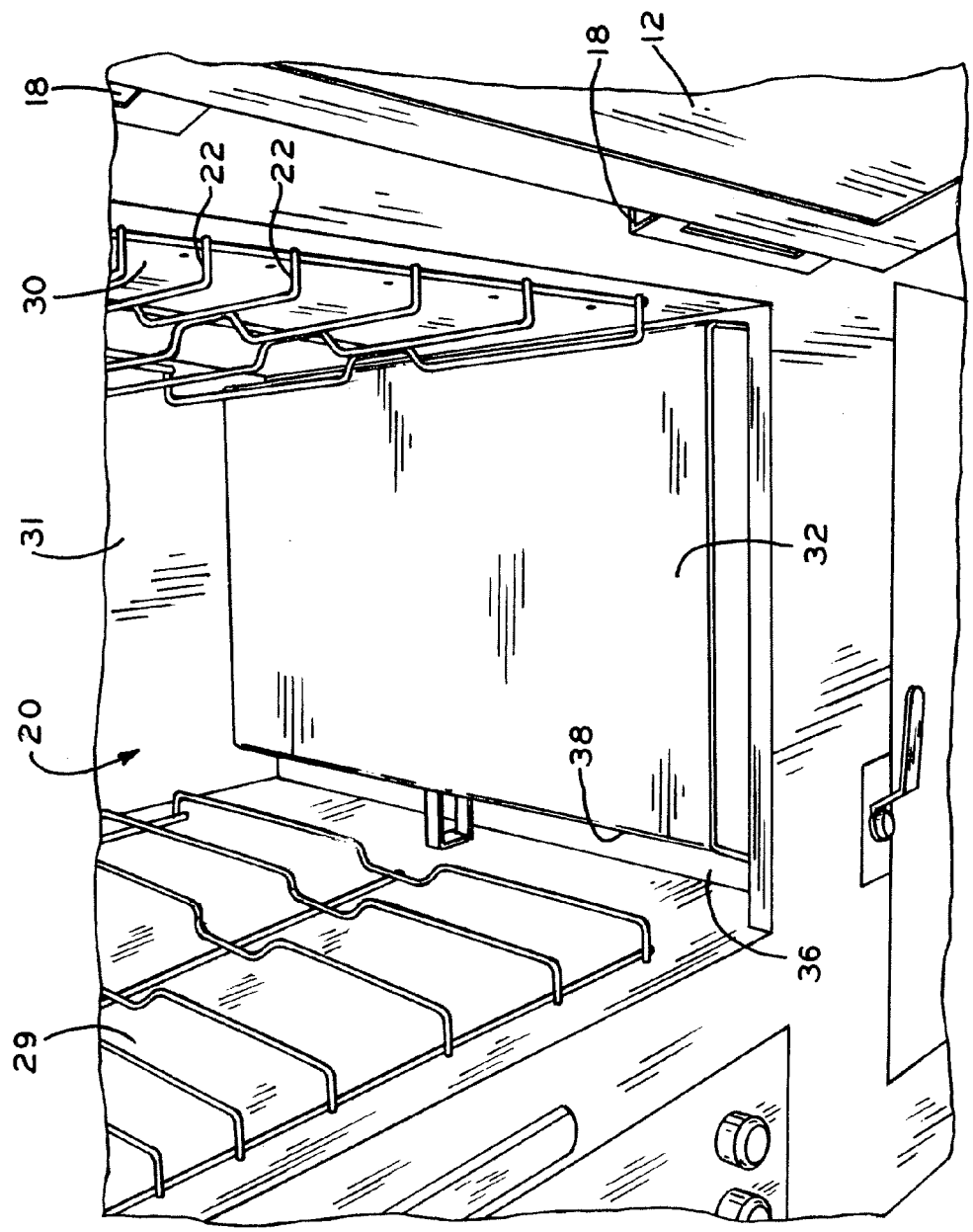

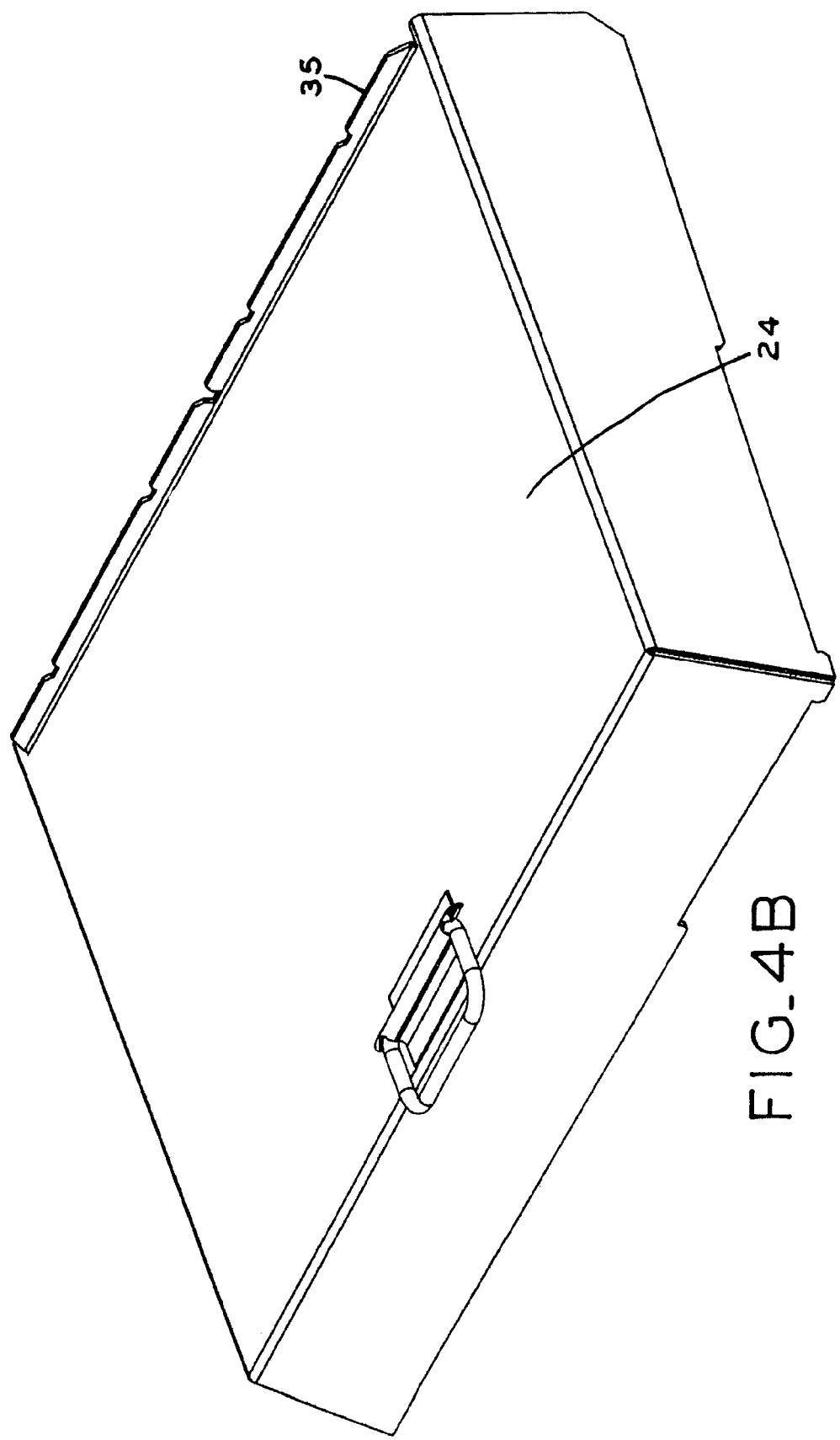

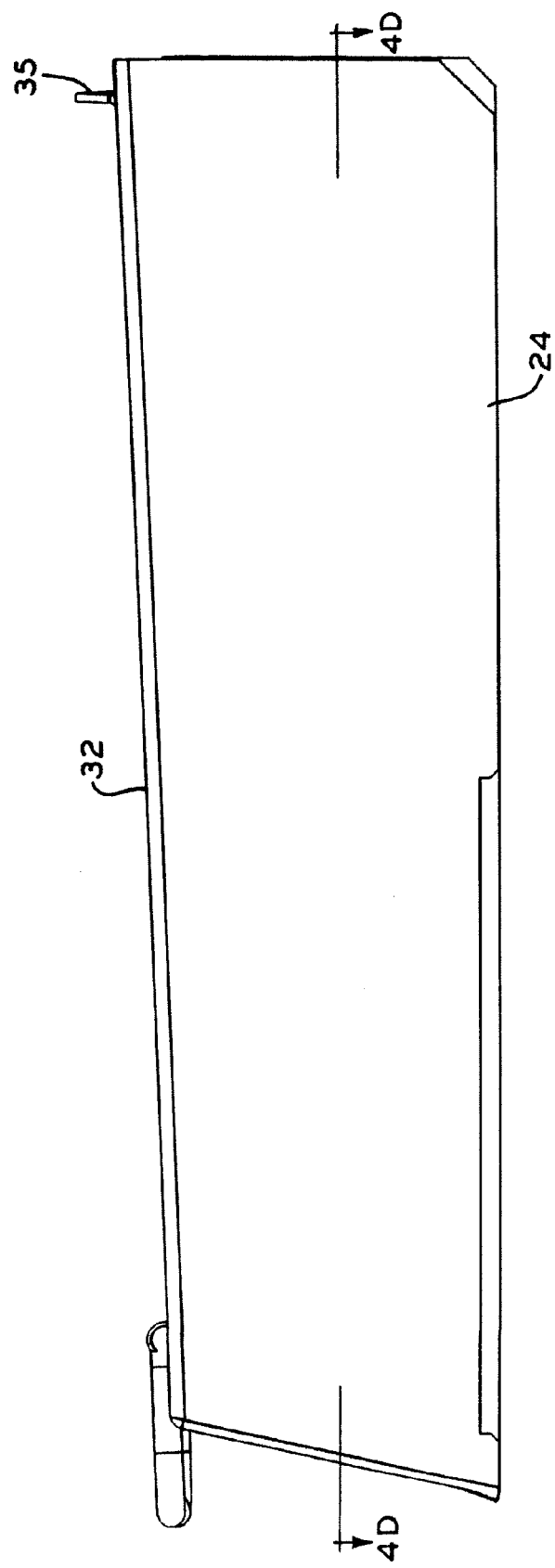

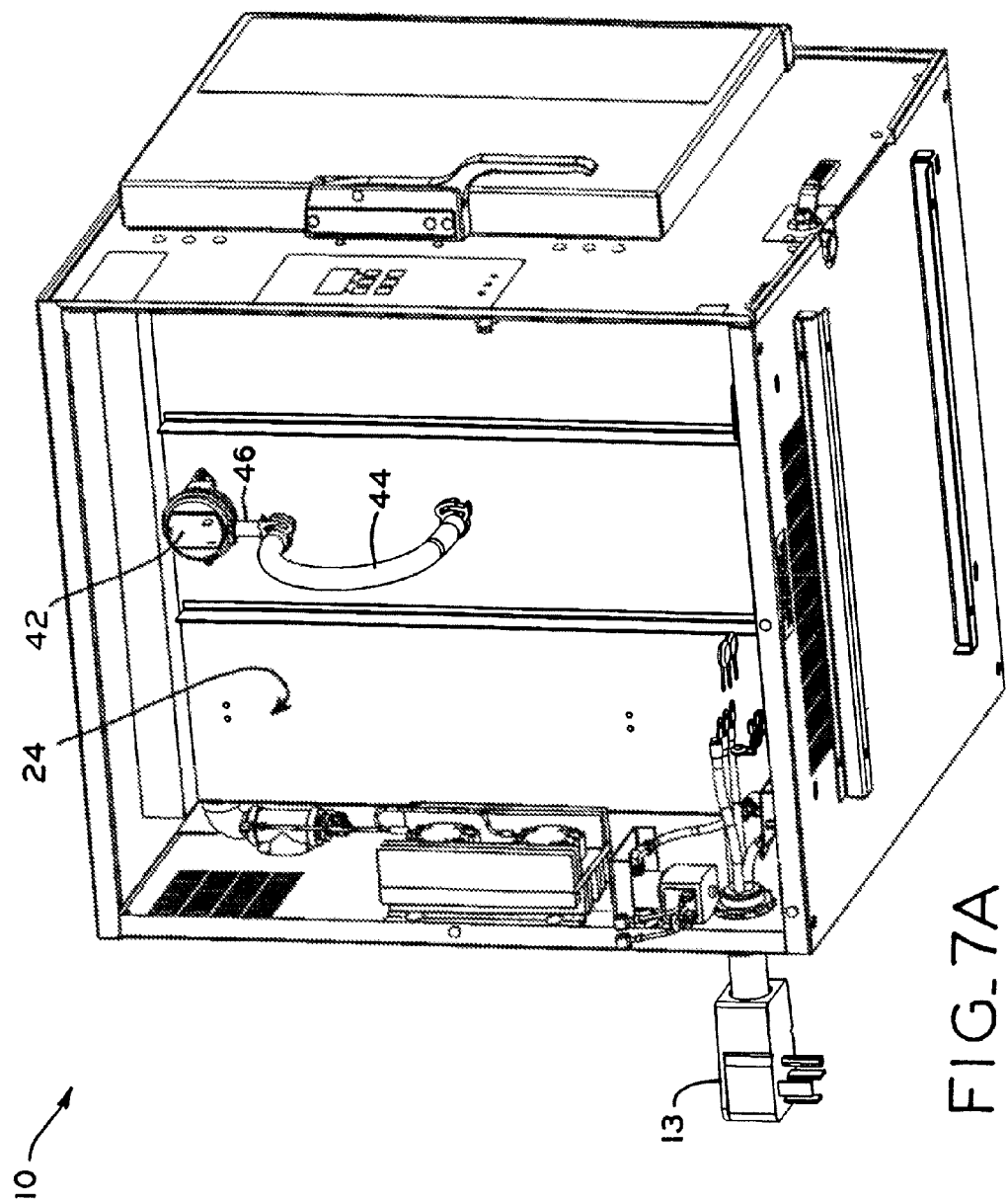
FIG._7A

METHOD AND APPARATUS FOR DIRECTING STEAM DISTRIBUTION IN A STEAM COOKER

CROSS REFERENCE TO RELATED APPLICATIONS

This application claims the benefit under Title 35, U.S.C. §119(e) of U.S. Provisional Patent Application Ser. No. 61/145,598, entitled METHOD AND APPARATUS FOR DIRECTING STEAM DISTRIBUTION IN A STEAM COOKER, filed on Jan. 19, 2009, the disclosure of which is expressly incorporated by reference herein.

BACKGROUND

1. Field of the Invention

The present invention relates to steam cookers.

2. Description of the Related Art

Steam cookers are used in commercial food service applications to quickly heat and/or cook food. In order to heat and/or cook food in a steam cooker, water is heated until it changes phase to become steam. The steam is then circulated through the cooker using a fan or other circulation mechanism to allow the steam to contact the food and increase the temperature of the food. Additionally, a vacuum pump may be used to remove air from the cooking chamber of the steam cooker. By removing air from the cooking chamber, the boiling point of the water within the steam cooker is depressed, allowing the water to be converted to steam at a lower temperature and causing the food within the steam cooker to be heated more rapidly.

While prior art steam cooker designs are effective, achieving a high level of pan-to-pan uniformity within the cooking chamber, i.e., ensuring that each pan of food within the cooking chamber is heated to substantially the same temperature, may be difficult. As a result, when the cooking chamber is loaded with pans of food that are to be cooked, some of the pans may not reach the desired cooking temperature as quickly as other pans. In order to heat all of the pans to the desired cooking temperature, the pans that reach the cooking temperature first may have to be overheated, i.e., may have to be heated to a temperature in excess of the desired cooking temperature resulting in over cooked food. Further, due to the constant operation of a mechanism to circulate the steam within the cooking chamber, a constant noise may be generated by the steam cooker.

SUMMARY

The present invention relates to a method and apparatus for directing steam distribution in a steam cooker. In one exemplary embodiment, steam is directed through a steam cooker by a plenum that is in fluid communication with a steam chamber. As steam is generated within the steam chamber, the steam fills the chamber where it is directed to the plenum. In one exemplary embodiment, the plenum is formed to extend vertically along an interior wall of the steam cooker. In one exemplary embodiment, the plenum is defined between an interior wall of the steam cooker and a steam distributor that has a plurality of openings formed therein. The openings in the steam distributor allow for steam rising within the plenum to exit into the cooking chamber by passing through the openings.

Advantageously, by selectively positioning the openings through the steam distributor, the steam distributor may allow for steam to exit into the cooking chamber at predetermined positions. As a result of the openings in the steam distributor, in conjunction with the formation of the plenum, steam may be distributed throughout the interior of the steam cooker in a manner that provides improved pan-to-pan uniformity, i.e., provides a more uniform cook temperature between each of the pans within the steam cooker, reduces cooking times, and allows the steam cooker to more quickly reach the desired cooking temperature. Further, by eliminating the need for a vacuum pump or other means to circulate steam within the cooking chamber of the steam cooker, the steam cooker generates substantially no noise during operation.

In one form thereof, the present invention provides a steam cooker, including: a cooking chamber defined by a plurality of walls; a steam chamber; a plenum in fluid communication with the steam chamber; a steam distributor having have a plurality of openings formed therein, the steam distributor cooperating with at least one of the plurality of walls of the cooking chamber to define the plenum, wherein steam entering the plenum from the steam chamber is circulated through the cooking chamber by passing through the openings in the steam distributor.

In another form thereof, a steam cooker includes a cooking chamber defined by a plurality of walls, one of the plurality of walls including a vent orifice in fluid communication with the cooking chamber and an environment external to the cooking chamber; a steam collector including a solid upper surface and a side wall, the solid upper surface and side wall defining a steam chamber; a gap defined by the side wall and at least one of the plurality of walls of the cooking chamber; a quantity of water positioned within the gap and within the steam chamber, the quantity of water flowable between the gap and the steam chamber, the quantity of water forming a water seal between the steam chamber and the cooking chamber; a plenum in fluid communication with the steam chamber; and a steam distributor having a plurality of openings formed therein, the steam distributor cooperating with at least one of the plurality of walls of the cooking chamber to define the plenum. The steam only exits the steam chamber via the plenum as steam in the steam chamber is directed through the plenum and out of the plurality of openings in the steam distributor.

In a further form thereof, a steam cooker includes a cooking chamber defined by a plurality of walls; a quantity of water; a heater positioned in the steam cooker to heat the quantity of water, the heater generating steam from the quantity of water upon heating the water to a certain temperature; and a pressure switch having a pressure limit and in fluid communication with the cooking chamber via a pressure orifice formed in one of the plurality of walls of the cooking chamber, the pressure switch communicatively connected to the heater, the pressure switch positioned in an elevated position relative to the pressure orifice, the pressure switch measuring a pressure differential between the cooking chamber and an atmospheric pressure, the pressure switch operable to signal the heater to turn off when the differential is above the pressure limit. The elevated position of the pressure switch allows gravitational forces to draw any formed condensate back into the cooking chamber.

In yet another form thereof, a steam cooker includes a cooking chamber defined by a plurality of walls, the plurality of walls including a vent orifice in constant fluid communication with the cooking chamber and an environment external to the cooking chamber, the vent orifice defining a vent area of at least 0.00785 square inches; a quantity of water; and a heater positioned in the steam cooker to heat the quantity of water, the heater generating a quantity of steam from the quantity of water upon heating the water to a certain temperature. A portion of the quantity of steam exits the cooking chamber via the vent orifice.

In one exemplary embodiment, the location, size, and number of openings in the steam distributor direct steam to each individual pan such as to achieve exceptional pan-to pan cooking uniformity.

In one exemplary embodiment, the steam distributor is adjacent to the long side of the food pans minimizing the length of the steam flow path across each pan.

In one exemplary embodiment, the walls of the steam chamber are not tightly sealed to the cooking chamber.

In one exemplary embodiment, the walls of the steam chamber extend beneath the water level in the bottom of the steamer creating a water seal around the sides and bottom of the steam chamber.

In one exemplary embodiment, the steam collector and steam distributor are easily removable for cleaning.

In one exemplary embodiment, the heaters of the steam cooker are controlled by a pressure device sensing pressure less than two inches of water column.

In one exemplary embodiment, condensation in the pressure sensing device is prevented by a long length of tubing between the cooking and/or steam chamber and the pressure sensing device causing steam to condense in the tubing before it can reach the pressure sensing device and/or by keeping the pressure sensing device warm so as to prevent condensation in it.

In one exemplary embodiment, the pressure sensing device is kept warm by a heater.

In one exemplary embodiment, the pressure sensing device is kept warm by locating it in a warm area such as against the uninsulated wall of the cooking or steam chamber.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 3 is a partial perspective view of the cooking chamber of the steam cooker of FIG. 2;

FIGS. 4B-4C are perspective and side views, respectively, of the steam collector of FIG. 4A;

FIGS. 7A-7C are perspective and elevational views of the internal controls of the steam cooker of FIG. 1A, depicting a pressure switch connected thereto.

Corresponding reference characters indicate corresponding parts throughout the several views. The exemplification set out herein illustrates one exemplary embodiment of the invention, in one form, and such exemplification is not to be construed as limiting the scope of the invention in any manner.

DETAILED DESCRIPTION

Figure 1A:
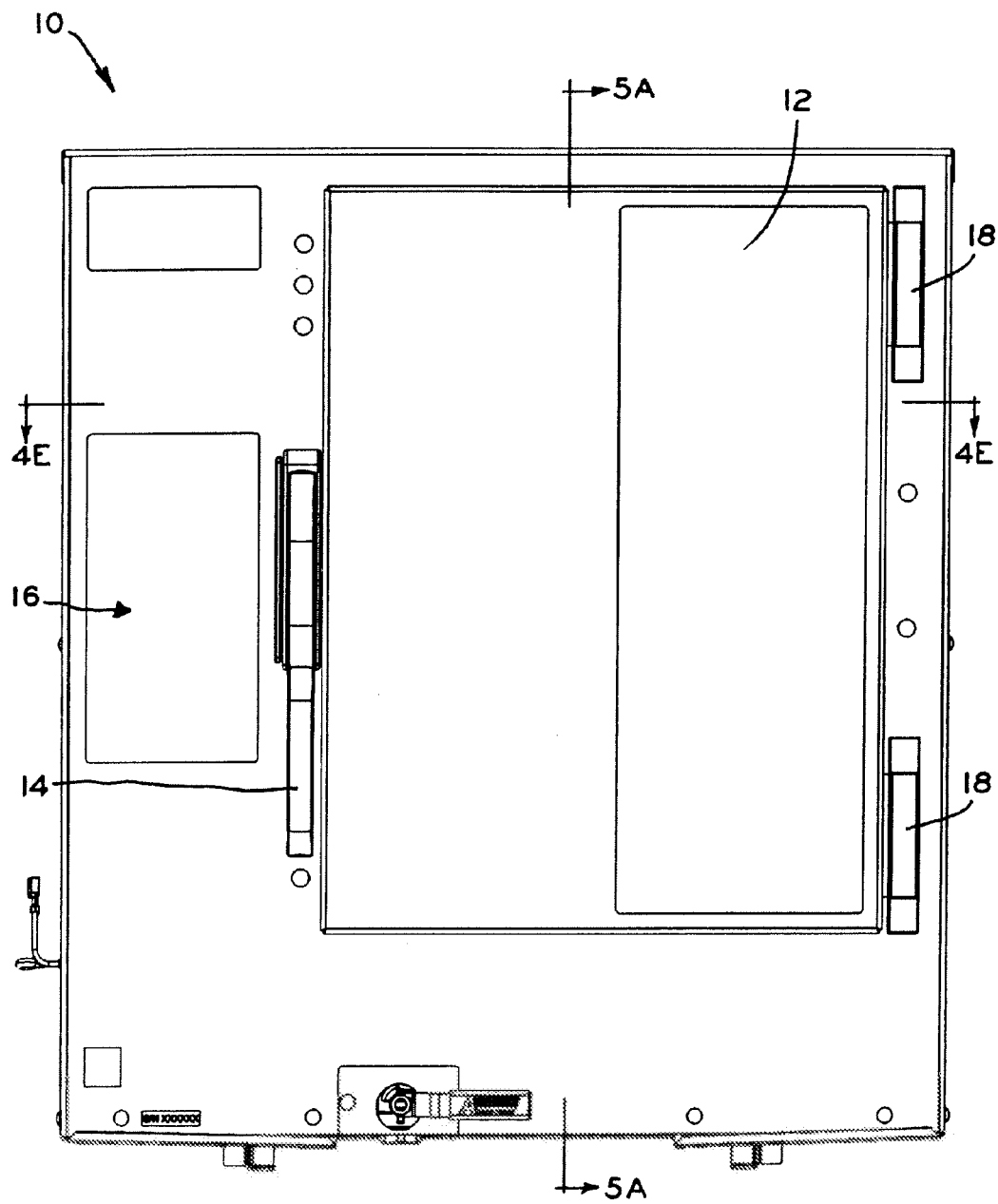
FIGS. 1A-1C are elevational, perspective, and side views of an embodiment of the steam cooker of the present invention depicting the door of the steam cooker in a closed position.
Figure 1B:
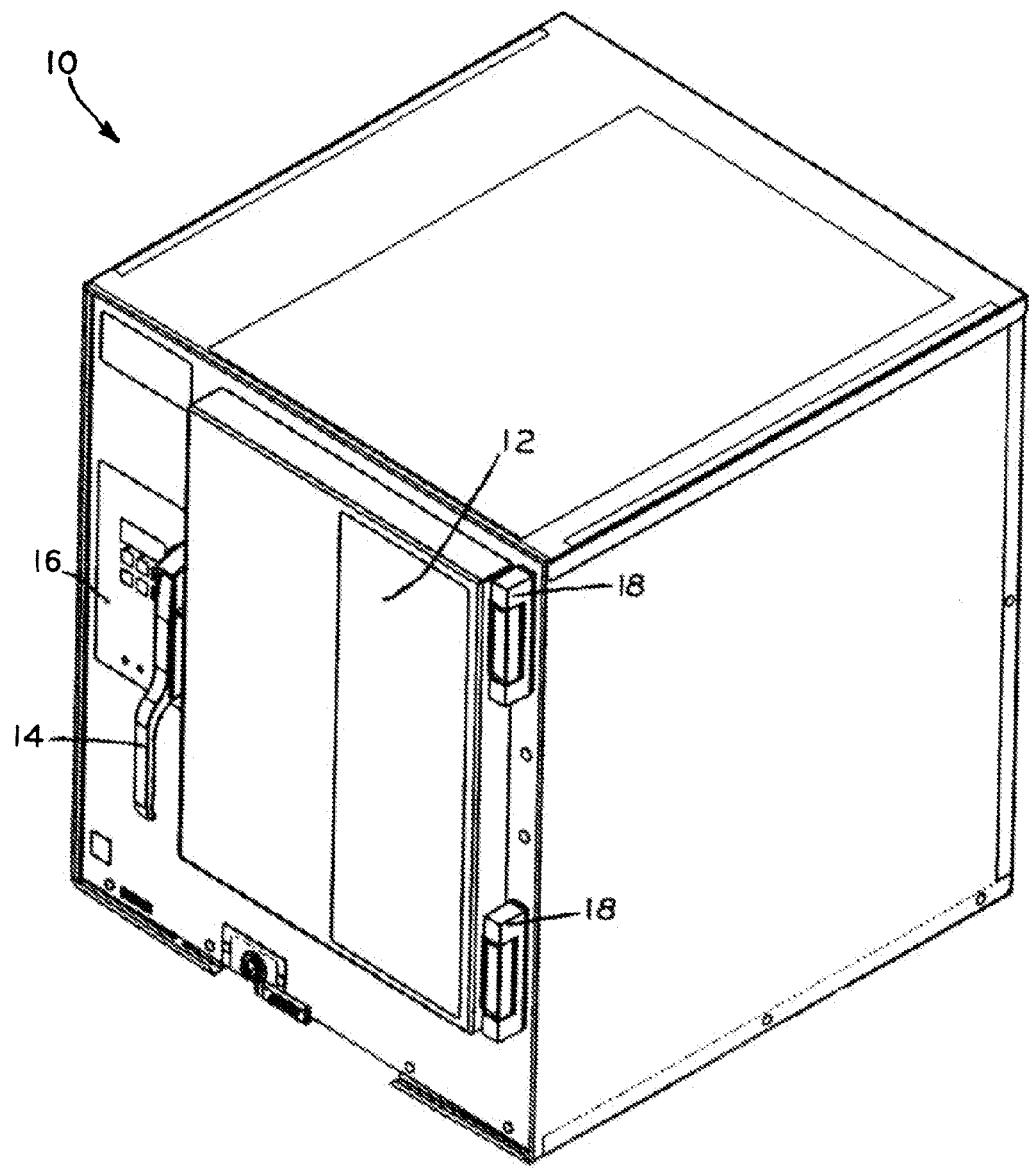
Figure 1C:
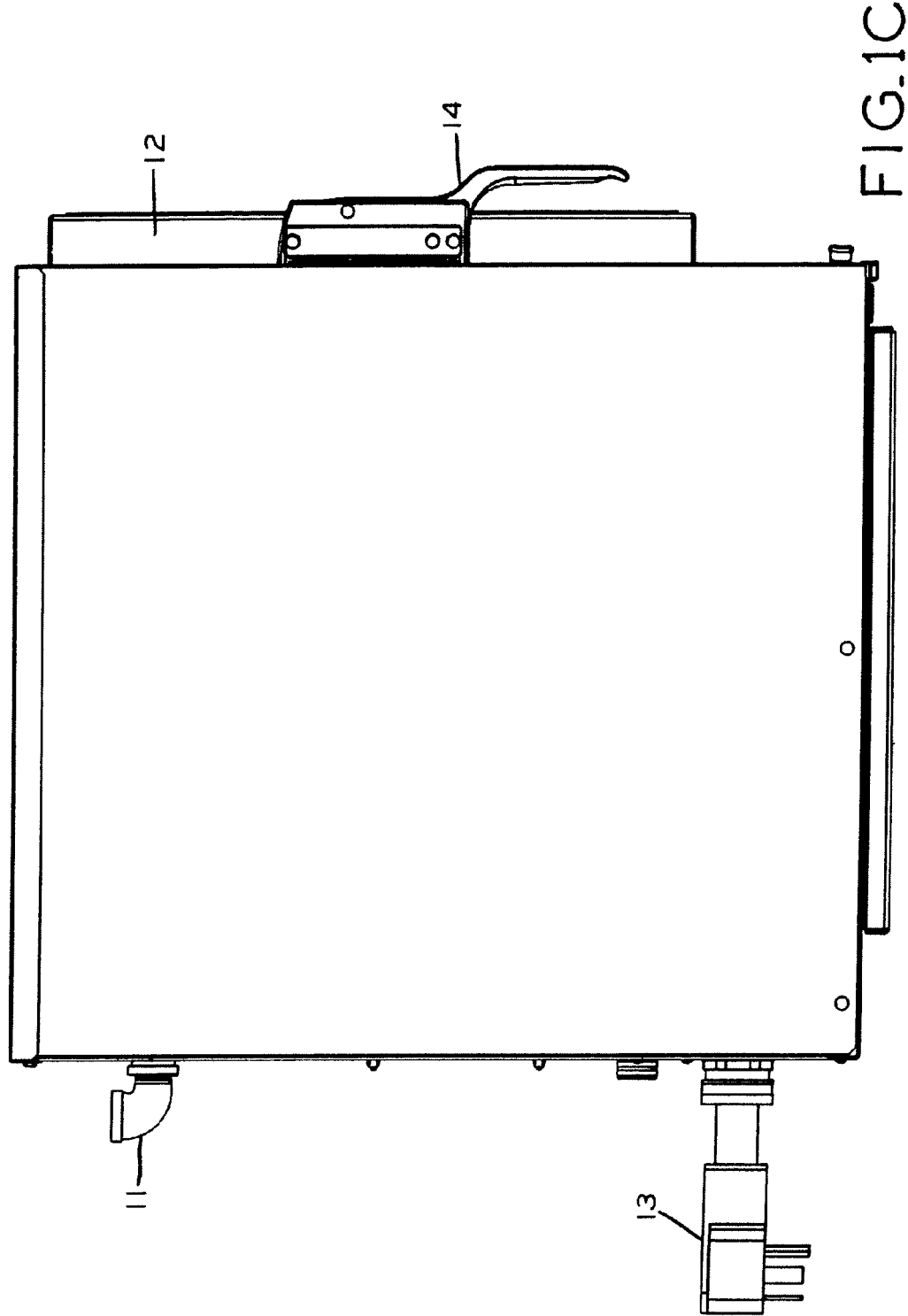
Figure 2:
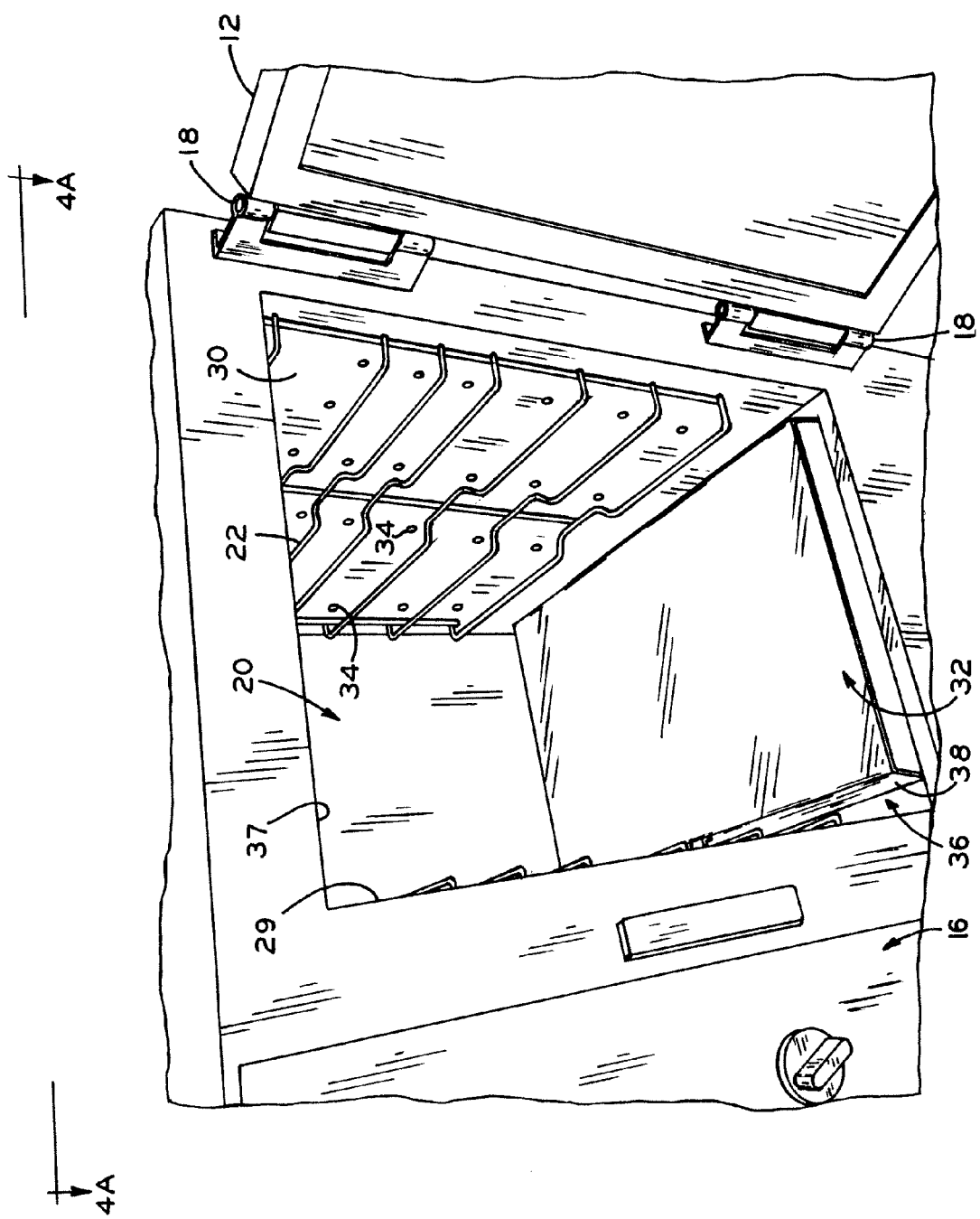
FIG. 2 is a partial perspective view of the steam cooker of FIG. 1A depicting the door of the steam cooker in an open position.

Referring to FIGS. 1A-1C and 2, steam cooker 10 is shown including door 12, handle 14, and control panel 16. In order to access the interior of steam cooker 10, door 12 may be opened by actuation of handle 16, which allows door 12 to pivot about hinges 18. With door 12 open, as shown in FIG. 2, wire rails 22 may be positioned within cooking chamber 20 of steam cooker 10. The wire rails 22 are supported within cooking chamber 20 by wire loops (not shown). Pans and/or trays of food to be heated and/or cooked may then be positioned on and supported by the wire rails.

With food positioned within cooking chamber 20, door 12 may be closed and steam cooker 10 activated, such as by setting a desired temperature and/or by turning on steam cooker 10, such as by using control panel 16. Specifically, when steam cooker 10 is activated, heaters positioned below steam chamber 24 (FIG. 4A) begin to heat water positioned within steam chamber 24. In one exemplary embodiment, the water is heated using electric heaters. In another exemplary embodiment, the water within steam chamber 24 is heated using natural gas and/or liquid propane heaters.

Figure 4A:
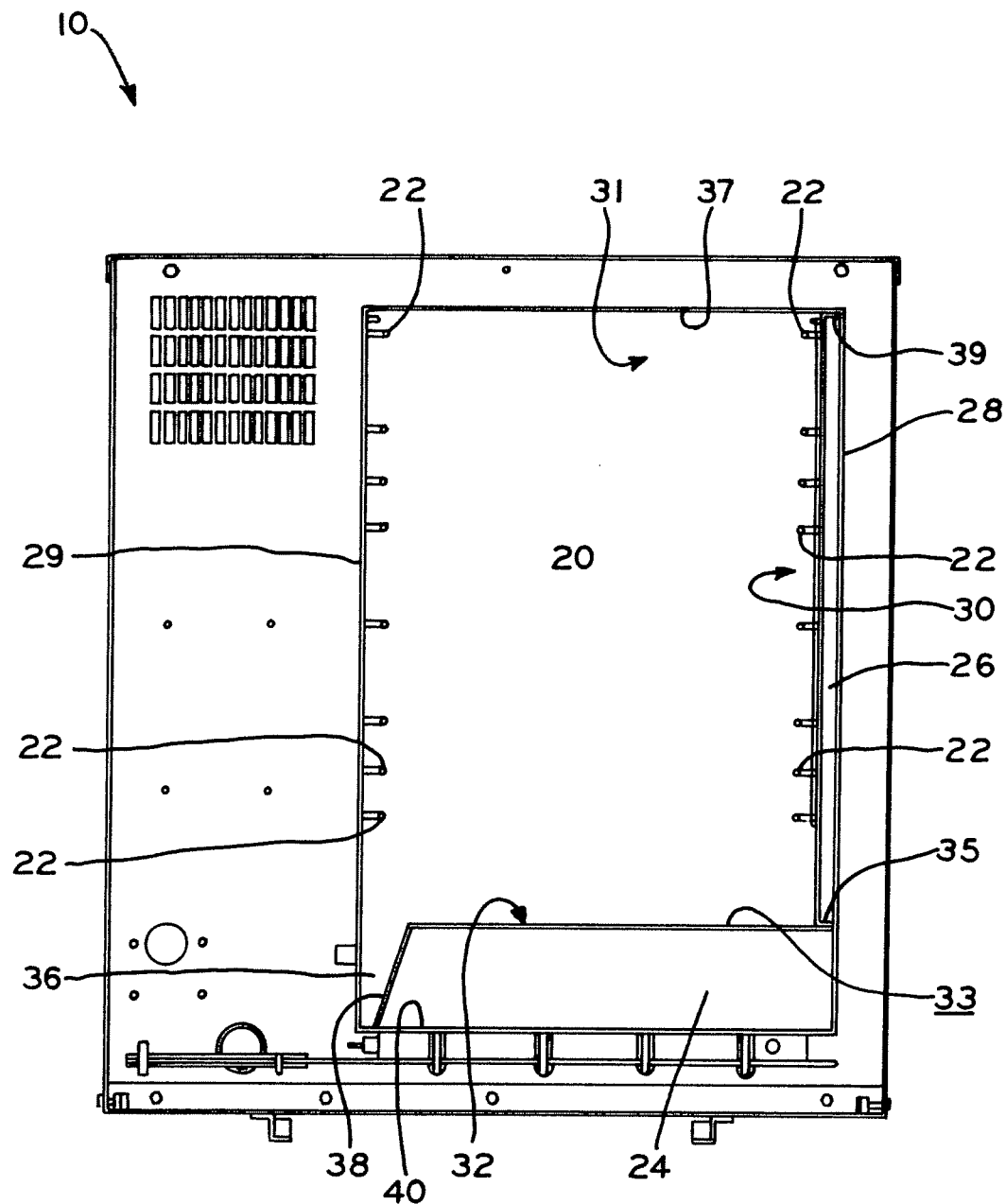
FIG. 4A is a cross-sectional view of the steam cooker of FIG. 1A taken along line 4A-4A of FIG. 2.
Figure 4D:
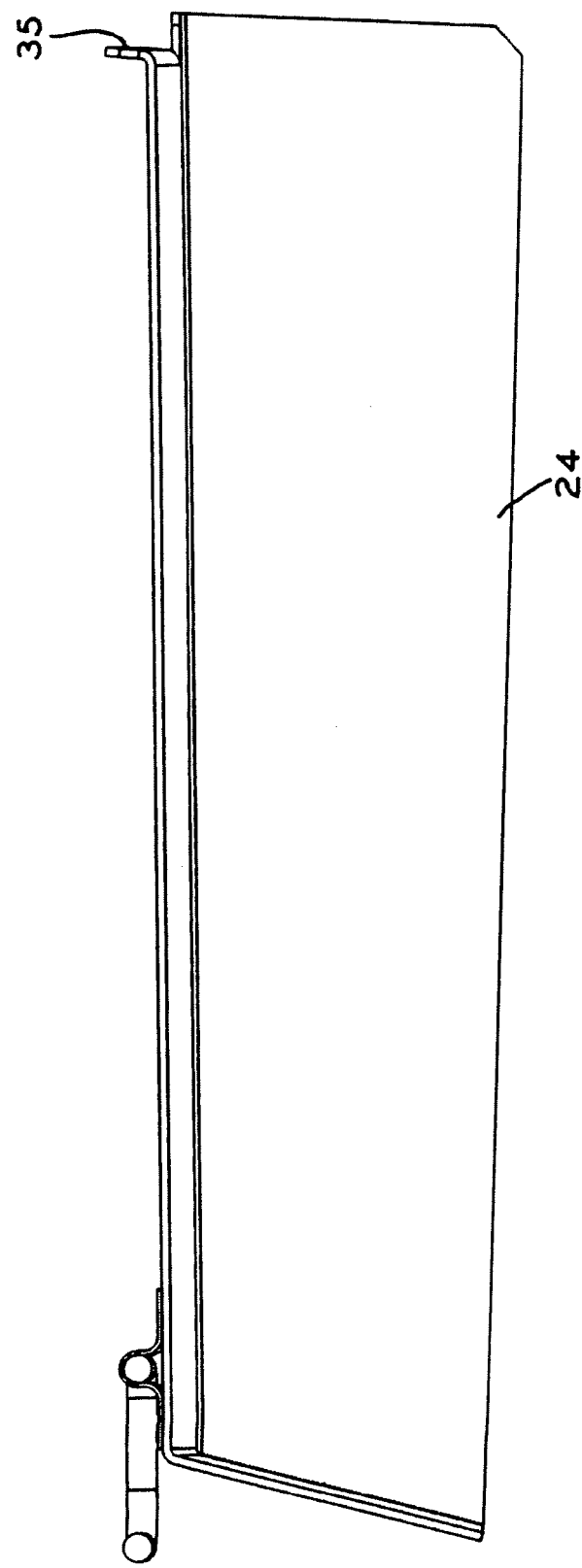
FIG. 4D is a cross-sectional view of the steam collector of FIG. 4A taken along line 4D-4D of FIG. 4C.
Figure 4E:
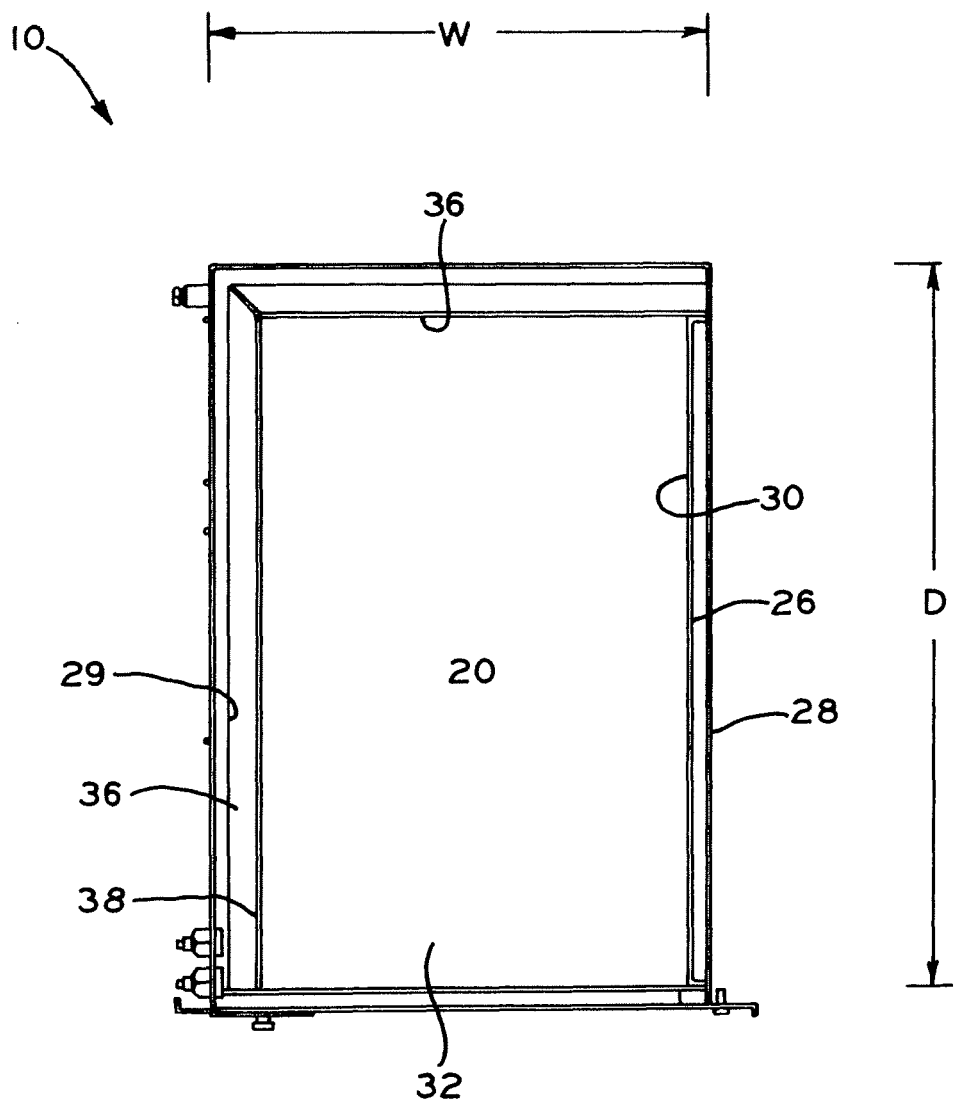
FIG. 4E is a cross-sectional view of the steam cooker of FIG. 1 taken along line 4E-4E of FIG. 1A.
Figure 5A:
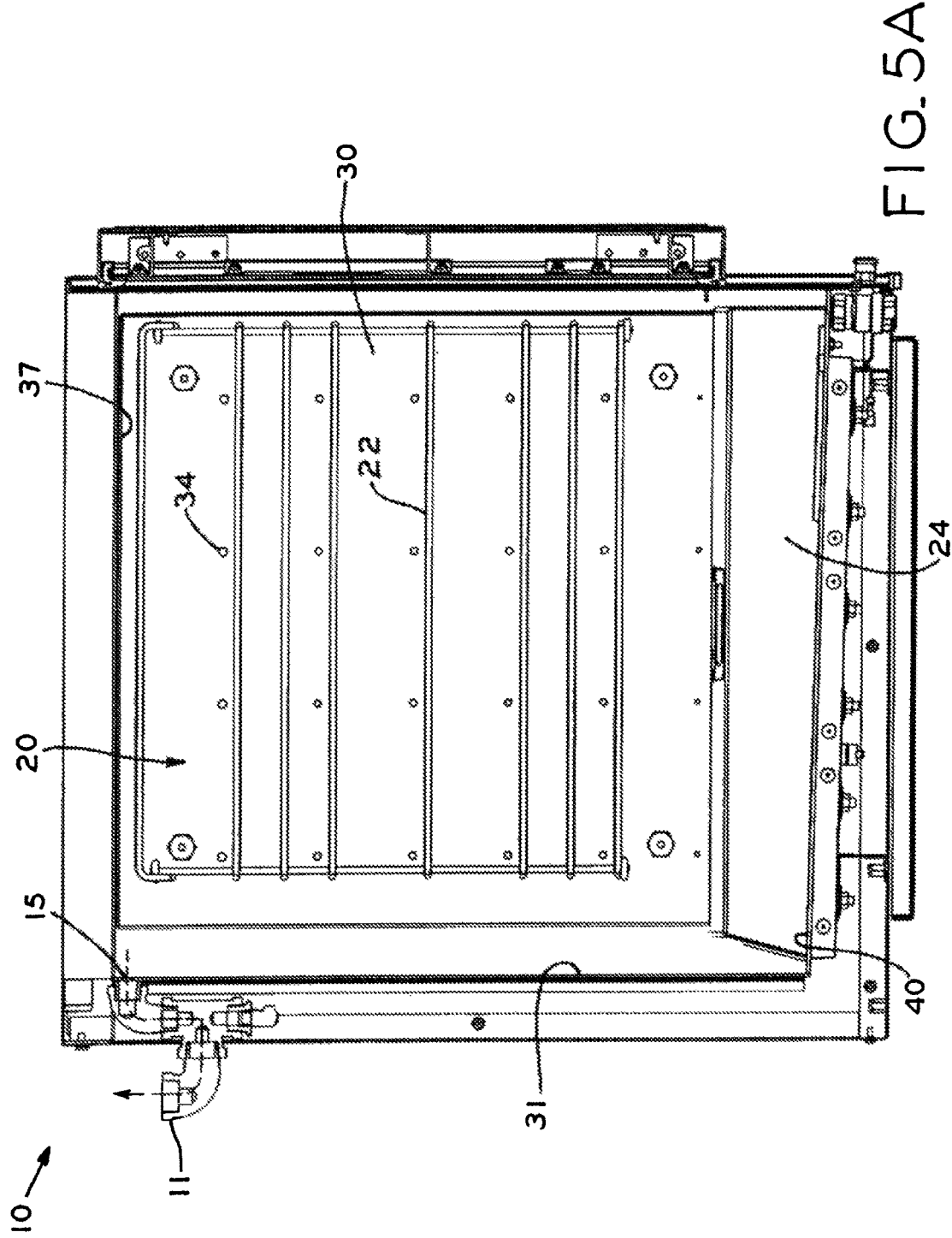
FIG. 5A is a cross-sectional view of the steam cooker of FIG. 1 taken along line 5A-5A of FIG. 1A.
Figure 5B:
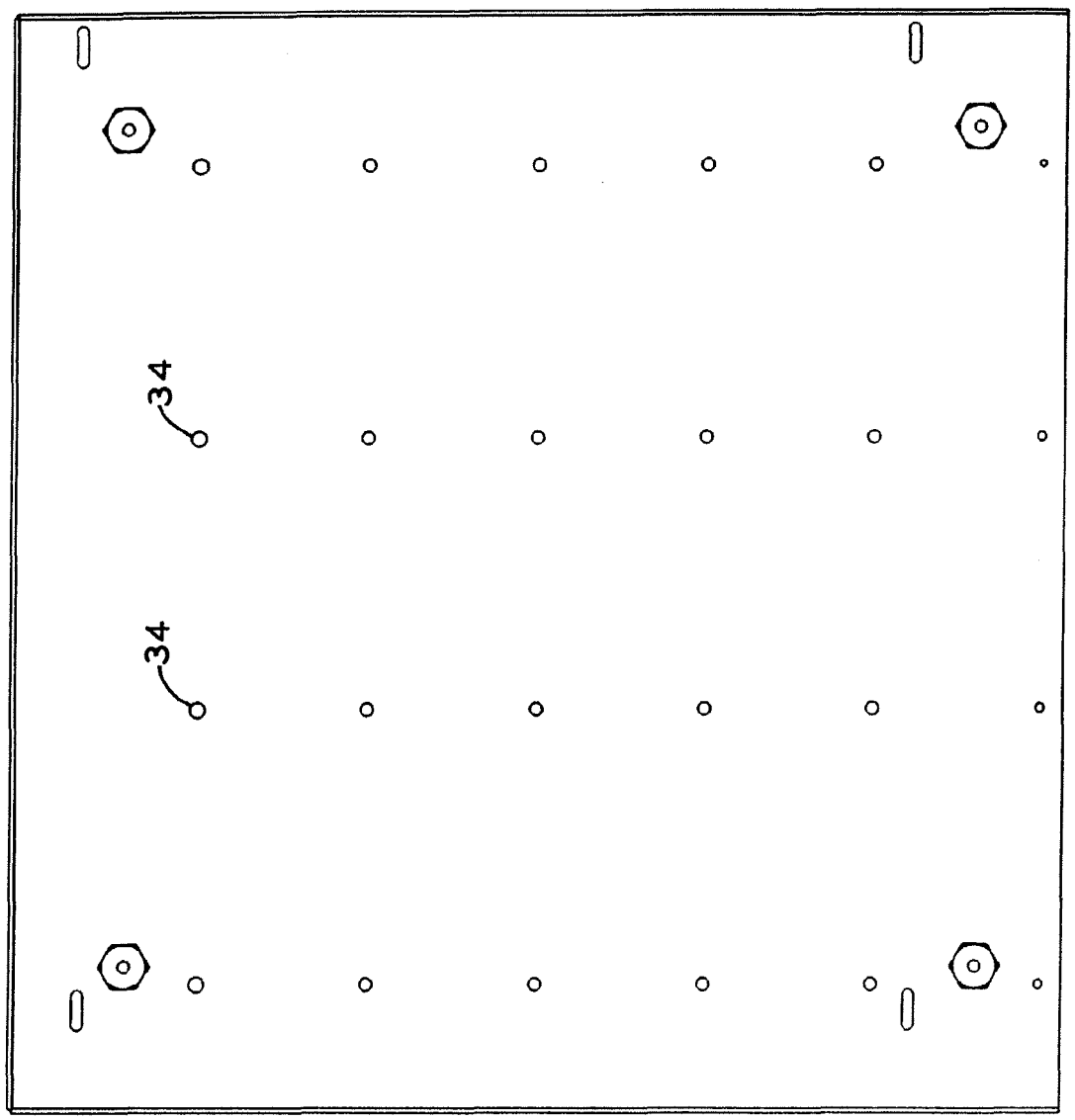
FIG. 5B is an elevational view of a first side of the steam distributor of the steam cooker of FIG. 1A.
Figure 6A:
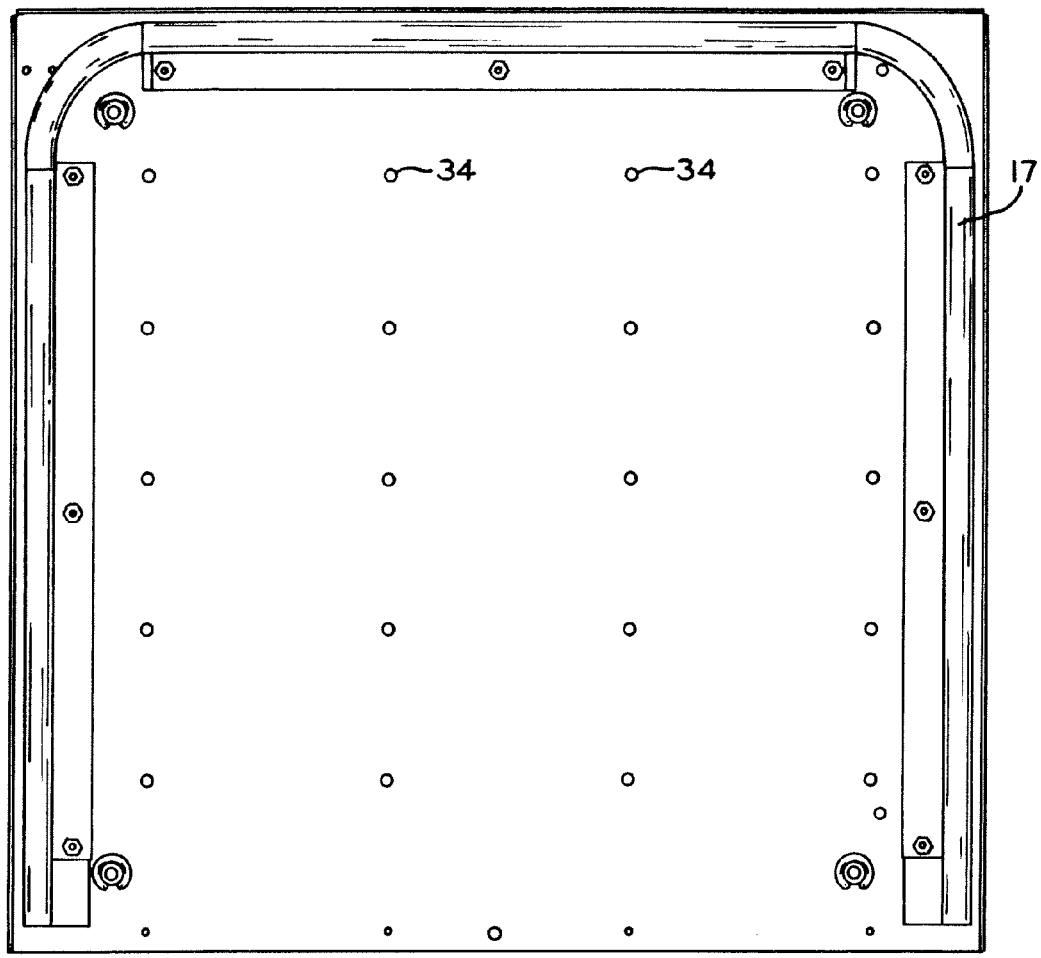
FIG. 6A is an elevational view of the steam distributor of the steam cooker of FIG. 1A, showing the side opposite the first side shown in FIG. 5B along with a gasket seal.
Figure 6B:
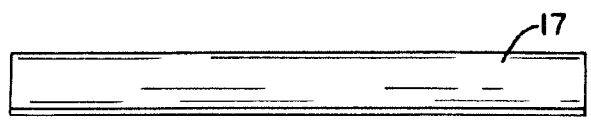
FIGS. 6B-6C are elevational and perspective views, respectively, of the gasket seal of FIG. 6A.
Figure 6C:
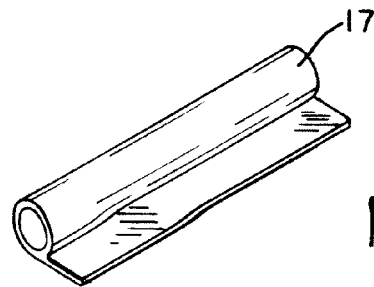

As steam is generated within steam chamber 24, the steam may begin to rise through plenum 26, shown in FIGS. 4A, 4E and 5A. Specifically, absent plenum 26, no other flow path for the substantial amount of steam generated in steam chamber 24 is provided. As a result, steam generated within steam chamber 24 is forced to enter plenum 26. Plenum 26 is formed adjacent to one of the interior walls of steam cooker 10 that defines cooking chamber 20. As shown in FIGS. 4A, 4E and 5A, plenum 26 is defined between interior wall 28 of steam cooker 10 and steam distributor 30. In one exemplary embodiment, steam distributor 30 is formed from a stainless steel sheet. Steam within plenum 26 enters cooking chamber 20 by passing through openings 34 in steam distributor 30, as described in detail below, and as shown in FIGS. 5A and 5B. One or more edges of the steam distributor 30 are sealed to a side of the cooking chamber 20. Such a seal prevents leaks from around the edges of the steam distributor 30 that may have a relatively large influence on pan-to-pan cooking uniformity. In an embodiment, such a seal may be made through use of a gasket 17 as shown in FIGS. 6A-6C. The gasket 17 is a gasket tubing having a round portion 19 and a flat portion 21, as shown in FIGS. 6A-6C. A metal plate 23 is positioned on top of the flat portion of the gasket seal to further fasten the gasket 17 to the stream distributor 30, as shown in FIG. 6A. Alternatively, a metal plate 23 may not be used to fasten the gasket 17 to the steam distributor 30. The gasket 17 interacts with the side of the cooking chamber 20 to create a leak preventing seal. The gasket 17 is positioned around the perimeter of the wall of the steam distributor 30 on each side except for the side of the wall that is adjacent to the steam collector 32.

Advantageously, by forming plenum 26 adjacent to one of interior walls 28, 29, which define the sides of cooking chamber 20, the steam has a reduced distance to travel in order to fill cooking chamber 20. Specifically, in one exemplary embodiment shown in FIG. 4E, depth D of cooking chamber 20 is substantially equal to two times width W. By placing plenum 26 adjacent to one of interior walls 28, 29, as opposed to interior wall 31, which defines the back side of cooking chamber 20, steam exiting steam distributor 30 may fill cooking chamber 20 by traveling a distance equal to width W, which is substantially equal to one-half of depth D. This allows for steam to quickly fill cooking chamber 20 and to rapidly begin heating pans and/or trays of food positioned within cooking chamber 20. Additionally, shortening the distance that the steam must travel to cross each pan results in improved cooking uniformity within each pan.

Referring to FIG. 4A, in one exemplary embodiment, steam distributor 30 is supported by steam collector 32, which defines steam chamber 24. In one exemplary embodiment, steam distributor 30 is supported by upper surface 33 of steam collector 32 and extends upward toward top surface 37 of cooking chamber 20. In one exemplary embodiment, when steam distributor 30 is supported atop upper surface 33 of steam collector 32, a portion of upper surface 33 extends behind steam distributor 30 in the direction of plenum 28. In one exemplary embodiment, this portion of steam collector 32 defines flange 35 as shown in FIG. 4B, which is bent upward to extend in a direction substantially parallel to the longitudinal axis of steam distributor 30. A gap is defined between flange 35 and interior wall 28 of cooking chamber 20 through which plenum 26 passes. By positioning steam distributor 30 atop steam collector 32 and adjacent to flange 35 on the side of flange 35 opposite the gap, the amount of steam that may exit plenum 26 prematurely by passing between steam distributor 30 and steam collector 32 is reduced.

Additionally, as shown in FIG. 4A, steam distributor 30 may also include flange 39. Flange 39 is formed to extend adjacent to and along top surface 37 of cooking chamber 20. In one exemplary embodiment, flange 39 contacts interior wall 28 to create a seal that restricts the passage of steam out of plenum 26 between interior wall 28 and flange 39. Further, by aligning the lower portion of steam distributor 30 adjacent to flange 35 of steam collector 32 and aligning flange 39 of steam distributor 30 with top surface 27 of cooking chamber 20, proper positioning of steam distributor 30 within cooking chamber 20 is ensured. This allows for steam collector 32 and steam distributor 30 to be easily removed and replaced for cleaning and/or other maintenance.

An embodiment of the removable steam collector is shown in FIGS. 4B-4D. The steam collector 32 includes a handle 25 with which the steam collector 32 may be removed. Alternatively, a handle 25 may not be included on the steam collector 32. As discussed above, the steam collector 32 includes a flange 35 that aligns with the lower portion of the steam distributor 30. The steam collector 32 further includes cutouts 47 positioned at least partially along a first and a second lower edge of the steam collector 32. A first cutout 47 is positioned on a first lower edge along side 38, or side wall 38, within the half portion of side 38 that is closest to the door 12. A second cutout 47 is positioned on a second lower edge along a door side of steam collector 32 adjacent to side 38 and positioned directly below door 12. The second cutout 47 is further positioned on the second lower edge within the half portion of the associated door side closest to the first cutout 47. In an embodiment, the cutouts 47 assist the steam collector 32 with creating a water seal between the steam chamber 24 and the gap 36 by allowing water to pass from the cutouts 47 and fill the gap 36 until the water is at a level of the cutouts 47 where an equilibrium is reached between the water level in gap 36 and the water level in steam chamber 24. The cutouts 47 provide fluid communication from an inside cover of the steam collector 32 to an outside cover so that the water seal is formed, preventing steam from escaping the steam chamber 24 and assisting to direct to steam up through the plenum 26.

The steam collector 32 is solid and has no holes or openings from which steam may escape. The steam collector 32 includes a solid upper surface and a side 38. The steam collector 32 has a sloped top surface to prevent splashes and to recirculate condensate.

Referring to FIGS. 4A and 5A, as steam is generated within steam chamber 24, it rises within plenum 26 where it begins to build in pressure. As the steam continues to rise and the pressure of the steam builds, it encounters openings 34 formed in steam distributor 30. Specifically, openings 34 may be positioned at predetermined locations to allow for steam to exit plenum 26 adjacent to pans and/or trays of food that are positioned within cooking chamber 20. In one exemplary embodiment, openings 34 are positioned above each of rails 22 to allow for steam to exit plenum 26 between adjacent pans and/or trays of food.

Alternatively, the plurality of openings 34 may be arranged in rows spaced apart at a distance substantially equivalent to the distance pans are spaced apart and positioned vertically to inject steam beneath corresponding pans. For instance, a steam cooker may be designed to hold up to six pans that are 2.5 inches deep and spaced 0.25 inches apart and may have a steam distributor 30 with six corresponding horizontal rows of openings 34, one row for each pan, which are spaced about 2.75 inches apart. The steam distributor 30 of the steam cooker 10 has a top row, a bottom row, and one or more middle rows. In an embodiment, the openings 34 may be positioned in one or more horizontal rows corresponding to a maximum usable number of pans, said one or more horizontal rows including a top row adjacent to the top surface 27 of the cooking chamber 20, a bottom row adjacent to the steam collector 32, and one or more middle rows positioned intermediate to the top row and the bottom row. In an embodiment, the bottom row is positioned closest to a source of steam, which may be steam chamber 24. The openings 34 are rounded with diameters that may increase in size the further up the row that the openings are part of is positioned on the steam distributor 30. Alternatively, the openings may be square or another shape. For round openings 34, the increasing diameter of the openings 34 from the bottom to top rows allow for less resistance to steam exiting the plenum 26 the further steam gets away from the steam source, which may be steam chamber 24. In an embodiment, the bottom row includes the smallest openings 34, the middle row includes openings 34 of a larger diameter than the openings 34 of the bottom row where the diameter of the openings 34 for the middle rows are the same, and the top row includes the largest openings 34. In the example above, there would be four middle rows.

Referring to FIGS. 5A, 5B, and 6A, steam distributors 30 may have varying sizes of openings 34, the variations in the sizes depending on how quickly the steam cooker can generate steam. For instance, in one embodiment, high powered steam cookers, using from about 12 kW to 17 kW, have a diameter of 0.260 inches for a top row opening 34, a diameter of 0.156 inches for a bottom row opening 34, and a diameter of 0.219 for middle row openings 34. In another embodiment, medium powered steam cookers, using from about 8 kW to 11 kW, have a diameter of 0.250 inches for a top row opening 34, a bottom row opening 34 diameter of 0.110 inches, and a diameter of 0.219 for middle row openings 34. In a further embodiment, low powered steam cookers, using about 6 kw, have a diameter of 0.235 inches for a top row opening 34, a bottom row opening 34 diameter of 0.110 inches, and a diameter of 0.219 for middle row openings 34.

In an embodiment, each horizontal row includes four openings 34. Each row of the steam distributor 30 may include between two to eight openings 34. However, the diameters of openings 34 adjusts according to the number of openings 34 per row. For example, if two openings 34 are used per horizontal row, diameters of the openings 34 are increased to maintain about a same total hole area as where four openings 34 per row are maintained. The openings 34 are evenly spaced within each horizontal row for good steam distribution. The openings 34 need to be far enough in from an edge of the steam distributor 30 so that, if a gasket seal 17 is used on the steam distributor 30, the openings 34 are not covered. In an embodiment, the openings should be positioned at about 1.5 inches from an edge of the steam distributor 30.

As the steam rises within plenum 26, a portion of the steam will exit through the first series of openings formed in steam distributor 30. The steam remaining in plenum 26 will continue to rise until the next series of openings in steam distributor 30 is encountered. At this point, another portion of the steam will exit through the openings. The steam remaining in plenum 26 will continue to rise and/or the pressure of the steam continue to build, repeating this process until the last series of openings in the steam distributor is encountered, at which point substantially all of the steam within plenum 26 will have entered cooking chamber 20 by passing through openings 34 in steam distributor 30.

As the steam travels through cooking chamber 20, the steam will begin to cool. If cooled sufficiently, the steam condenses within cooking chamber 20. The water resulting from the condensing of steam within the cooking chamber may fall toward the bottom of the cooking chamber where it may contact upper surface 33 of steam collector 32. Water on upper surface 33 of steam collector 32 may be directed downward into gap 36 defined between interior wall 29 and side 38 of steam collector 32. Side 38 of steam collector 32 forms a relatively tight seal with bottom 40 of cooking chamber 20. In this manner, water positioned within steam chamber 24 is substantially retained within steam chamber 24.

In one exemplary embodiment, a fluid tight seal is not formed between bottom 40 of cooking chamber 20 and side 38 of steam collector 32. As a result, water within steam chamber 24 may exit steam chamber 24 and begin to fill gap 36 until the level of water within gap 36 reaches equilibrium with the level of water within steam chamber 24. In an embodiment, the water exits steam chamber 24 via cutouts 47, as shown in FIG. 4B. As a result of water from steam chamber 24 filling gap 36, steam generated in steam chamber 24 is prevented from passing out of steam chamber 24 between bottom 40 of cooking chamber 20 and side 38 of steam collector 32. Thus, substantially all of the steam generated in steam chamber 24 is directed through plenum 26 and out of openings 34 in steam distributor 30. Additionally, as steam within cooking chamber 20 condenses to form water that enters gap 36, as described in detail above, a portion of the water in gap 36 may enter steam chamber 24 by passing between bottom 40 of steam chamber 24 and side 38 of steam collector 32. As a result of water passing from gap 36 into steam chamber 24, steam chamber 24 is prevented from going dry, i.e., having no water within steam chamber 24, and stopping the generation of steam within steam chamber 24.

Advantageously, by utilizing steam cooker 10 and allowing steam to be distributed throughout cooking chamber 20 through the use of plenum 26 and steam distributor 30, steam cooker 10 has achieved cooking times that are better than those previously achieved with the use of active components, such as a vacuum pump that removes air from the cooking chamber and/or a circulation device, such as a fan, that distributes the steam throughout the cooking chamber. As a result, the use of a vacuum pump or circulation device may be eliminated. Advantageously, by eliminating the need to utilize a vacuum pump or other circulation device, the cost to manufacture and service steam cooker 10 is reduced.

Additionally, by eliminating the use of a vacuum pump, steam cooker 10 can immediately begin reheating cooking chamber 20 after door 12 (FIG. 1A) of steam cooker 10 has been opened to remove food from and/or place food within cooking chamber 20. Specifically, the need to evacuate any air that may have entered cooking chamber 20 when door 12 was opened is eliminated. Thus, as soon as door 12 has been shut, steam cooker 10 may begin generating additional steam. This may be particularly advantageous in ala carte cooking, i.e., cooking in which only a single serving of a meal is being prepared at a given time.

Further, the use of plenum 26 and steam distributor 30 has also resulted in improved pan-to-pan uniformity, i.e., results in the creation of substantially even cook temperatures between each of the pans positioned within cooking chamber 20. As a result of this increase in pan-to-pan uniformity, the more consistent resulting cooked food product may be created by using steam cooker 10 as compared to prior art steam cookers. Additional details regarding steam cooker 10 and the benefits provided by the use of the same include the use of a passive steam distribution system that requires minimal user and maintenance intervention and has exceptional performance, including ENERGY STAR qualification. The ENERGY STAR Efficiency Requirements include cooking energy efficiency of, for the example of heavy load potatoes, a requirement of 50% and the steam cooker 10 performs at a cooking energy efficiency of 62%.

Advantageously, steam is vented from the rear of the steam cooker 10, away from the operator. The steam cooker 10 automatically compensates for altitude and may include a gas-fired option. The electrical controls are simple, using few components. The passive system of steam cooker 10 may have no moving parts and may have parts that are removable for easy cleaning. The system has components that perform at a high level. The steam collector 32 funnels steam to the steam distributor 30 that directs steam above and below each pan. The performance for the steam cooker 10 has been tested to be competitive with any ASTM connectionless steamer report results issued by the Food Service Technology Center.

Figure 7B:
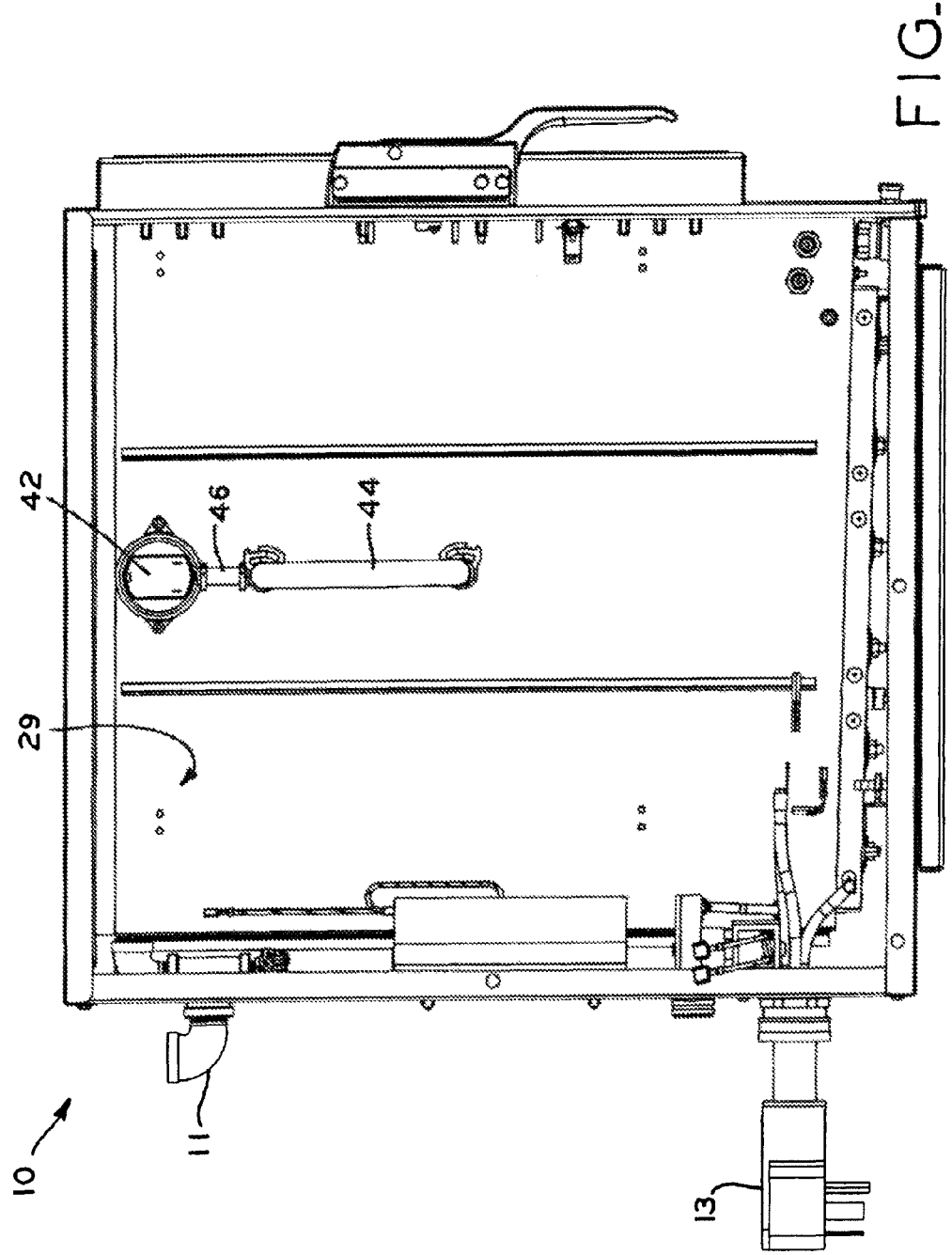

Referring to FIGS. 7A and 7B, in one exemplary embodiment, steam cooker 10 also includes pressure switch 42. The steam cooker further has a quantity of water and a heater positioned in the steam cooker to heat the quantity of water. The heater generates steam from the water after or upon heating the water to a certain temperature. If the pressure within cooking chamber 20 exceeds the atmospheric pressure by a predetermined amount of pressure, i.e., a pressure limit, pressure switch 42 interrupts the supply of power to the heaters that are heating the water within steam chamber 24 by operating to signal the heater to turn off, which, in effect, stops or turns off the heaters. As a result, the generation of steam is slowed and/or stopped, preventing the pressure within steam cooker 10 from reaching excessive levels. In one exemplary embodiment, pressure switch 42 is activated when the pressure within cooking chamber 20 exceeds atmospheric pressure by one-half inch water column of pressure.

Figure 7C:
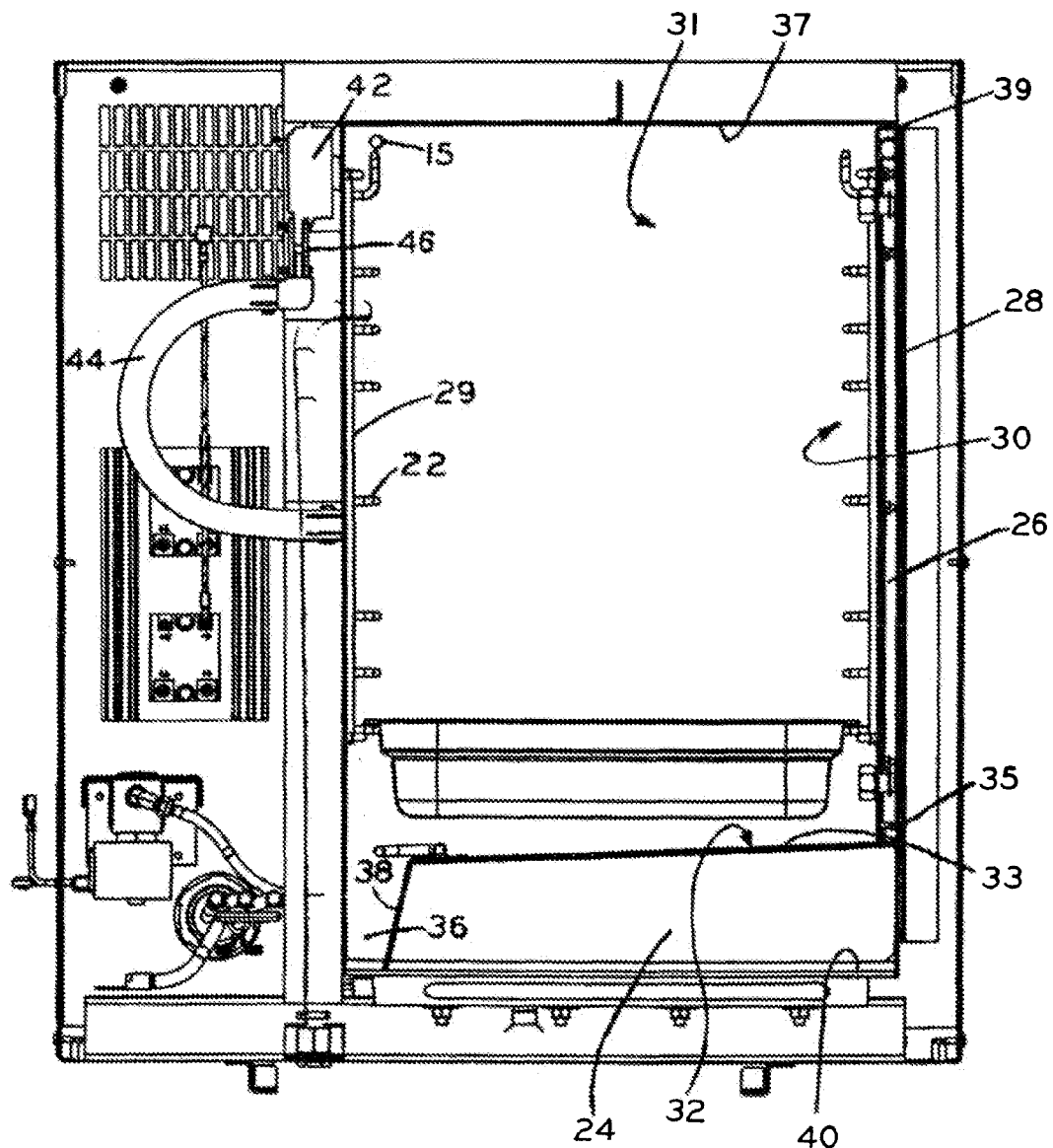

Advantageously, by using a pressure switch, such as pressure switch 42, that is activated by a substantially small pressure increase, the amount of steam that is discharged into the ambient environment is reduced. Specifically, in one exemplary embodiment, cooking chamber 20 is in fluid communication with the ambient environment via an exhaust tube 11, as shown in FIG. 7B, having a restricted orifice 15, as shown in FIG. 7C. A restricted orifice 15 is, for example, an orifice of decreased diameter relative to the exhaust tube, formed therein. Thus, and as shown in FIGS. 7A-7C, as the pressure within cooking chamber 20 rises, steam begins to exit cooking chamber 20 by passing through the exhaust tube 11 and the orifice 15 formed therein to vent steam from cooking chamber 20 into the ambient environment. This allows for passive venting to atmosphere through the orifice 15, located on an interior back wall of the cooking chamber 20, via constant fluid communication to an exhaust tube 11. The exhaust tube is positioned on an exterior back wall of the steam cooker. The exhaust tube 11 is open to ambient air. As a result of venting cooking chamber 20, i.e., releasing steam from within cooking chamber 20, the pressure within cooking chamber 20 is reduced. Once the pressure has been reduced by a sufficient amount, the flow of steam through the exhaust tube 11 and, thus, the venting of cooking chamber 20, is correspondingly reduced. In this manner, the vent orifice 15 prevents the steam cooker 10 from being overly pressurized when cooking. Further, air that otherwise forms an insulating blanket around food that is being cooked instead escapes from the steam cooker 10 via the orifice 15. Moreover, this venting to atmosphere prevents the steam cooker 10 from drawing a vacuum upon cooling, eliminating the need for active pressure control devices or reinforcement of the steam cooker 10 to support pressure or vacuum loads.

The orifice 15 is a passive flow control device where the size of the orifice 15 controls the rate of venting through the orifice 15. A larger orifice 15 increases a venting rate and decreases cook time for small loads of food, such as a single serving of food. A smaller orifice 15 decreases a venting rate but increases energy efficiency of a steam cooker 10. The orifice 15 is sized to achieve a good combination of energy efficiency and cooking speed. In an embodiment, the vent orifice 15 may be round and ranges from about 0.10 inches to 0.5 inches in diameter. In another embodiment, the size of the vent orifice 15 is 0.305 inches in diameter. In an embodiment, the vent orifice 15 may define a vent area of at least 0.00785 square inches, a vent area being an area defined by a wall that defines the vent orifice 15. The vent orifice 15 may be square or another shape.

By using pressure switch 42, pressure switch 42 may be activated to slow and/or stop the generation of steam in steam chamber 24, as described in detail above, prior to the pressure in cooking chamber 20 reaching a pressure sufficient to cause a substantial increase in the venting of steam from cooking chamber 20 into the ambient environment. Upon activation, heaters are turned off until pressure in the chamber is reduced by atmospheric venting to a preset acceptable level or value. As a result, the efficiency of steam cooker 10 is improved, as less of the steam generated by steam cooker 10 is vented to the ambient environment. The pressure switch 42 measures a pressure difference between the cooking chamber 20 and the ambient environment and is set to a preset value, or pressure limit. By measuring such a pressure difference, the pressure switch 42 automatically compensates for reduced boiling points resulting from increasing elevation. Once the measured pressure goes above the preset value, the heaters, powered by plug 13, are turned off to conserve energy and to only allow energy to be put into the steam cooker at a rate that food can absorb. In an embodiment, the pressure switch 42 has a preset value in the range of about 0.2 to 3.0 inches water column. Alternatively, the pressure switch 42 has a preset value of 0.5 inches water column. Such a lower pressure switch setting allows door 12 to have an easier seal.

Additionally, by utilizing pressure switch 42 to regulate the accumulation of pressure within cooking chamber 20, which is in fluid communication with steam chamber 24 via plenum 26, the pressure within steam chamber 24 is correspondingly regulated. As a result, the pressure in steam chamber 24 cannot rise to a level that is sufficient to force water within steam chamber 24 between bottom 40 of steam collector 32 and side 38 of steam collector 22 and into gap 36, which is described in detail above. As a result, water remains within steam chamber 24, which prevents steam chamber 24 from going dry.

While the use of pressure switch 42 provides several advantages, condensation within pressure switch 42 may, due to the small amount of pressure necessary to activate pressure switch 42, cause pressure switch 42 to be activated prematurely. In order to overcome this problem, pressure switch 42 is in fluid communication with cooking chamber 20 via tubing 44 and 46. In an embodiment, pressure switch 42 is in fluid communication with cooking chamber 20 via a pressure orifice 49 formed in one of the plurality of walls of cooking chamber 20. The pressure switch 42 is positioned in an elevated position relative to the pressure orifice 49, where the elevated position allows gravitational forces to draw any formed condensate back into cooking chamber 20. Tubing 44 extends out of and away, or upwardly, from cooking chamber 20 until tubing 44 begins to loop back toward pressure switch 42, where tubing 44 connects to tubing 46. In one embodiment, the tubing 44 is oriented in a U-shaped position so that any formed condensate runs back into the cooking chamber 20 via a pressure orifice 49 in fluid communication with tubing 44 due to gravitational forces. Tubing 46 is connected to the inlet of pressure switch 42. As steam rises within tubing 44, it exits cooking chamber 20 and begins to cool. This causes the steam to condense within tubing 44 before reaching pressure switch 42. Steam that condenses within tubing 44 drains downward through tubing 44 where it reenters cooking chamber 20 via the orifice 49 in fluid communication with the tubing 44. In this manner, steam that condenses is substantially entirely prevented from reaching pressure switch 42 and, correspondingly, prevented from prematurely activating pressure switch 42 as may otherwise occur via condensation within the pressure switch 42. Rather, steam, without condensate, reaches the pressure switch 42 to accurately assist with measuring the pressure within the cooking chamber 20. In an embodiment, the tubing 46 is silicone tubing. In an embodiment, the tubing 46 is internally 0.5 inches in diameter and 12 inches long. In an embodiment, the tubing 44 and 46 are a first tubing and a second tubing having different diameters. The first tubing 46 is adjacent to pressure switch 42 and the second tubing 44 is adjacent to cooking chamber 20. The first tubing 46 and the second tubing 44 are positioned in series to each other.

In an embodiment, the pressure switch 42 may have a port designed for tubing that is smaller in size, such as 0.25 inches in diameter. To accommodate this size difference, the pressure switch port may connect to a tubing 46 that is smaller in diameter than tubing 44 and is of an acceptable size to connect to the port. In an embodiment, the pressure switch is the one manufactured by Cleveland Controls under Part No. AT0E-

3617-1 and Vendor No. NS2-1092-00. The Cleveland Controls pressure switch includes electrical terminals sealed with epoxy for leak free operation.

In an exemplary embodiment, tubing 44 has a substantially greater diameter than tubing 46. In an embodiment, tubing 46 is a proximal tubing 46 and tubing 44 is a distal tubing 44 having a diameter substantially greater than the diameter of tubing 46 and large enough to prevent a bridge of water from forming within the distal tubing 44. A bridge of water may otherwise form and exert pressure on the pressure switch 42, causing premature activation. As steam enters tubing 44 via an orifice 49 within the cooking chamber 20, it decreases in velocity. This decrease in velocity of steam further slows the movement of steam within tubing 44 and increases the likelihood that steam within tubing 44 will condense before reaching tubing 46 and/or pressure switch 42. In an exemplary embodiment, pressure switch 42 is positioned above tubing 44 and 46 so that the pressure switch 42 is at an elevated position above the position of the orifice 49 from which steam enters tubing 44. In one exemplary embodiment, pressure switch 42 is positioned adjacent to cooking chamber 20, such as by positioning pressure switch 42 against an uninsulated portion of a wall of cooking chamber 20. By positioning pressure switch 42 adjacent to cooking chamber 20, an additional mechanism for preventing the premature activation of pressure switch 42 is provided. Specifically, by positioning pressure switch 42 adjacent to cooking chamber 20 and on an exterior side wall of the steam cooker, the heat within cooking chamber 20 helps to keep any steam that may inadvertently enter pressure switch 42 from condensing. In one exemplary embodiment, a heater (not shown) is positioned near or within pressure switch 42 to keep pressure switch 42 at an elevated temperature and prevent steam from condensing within pressure switch 42.

EXAMPLES

The following non-limiting Examples illustrate various features and characteristics of the present invention, which is not to be construed as limited thereto. The following abbreviations are used throughout the Examples unless otherwise indicated.

TABLE 1

| Abbreviations | |
| --- | --- |
| Abbreviation | Full Word |
| min | minute |
| ° | degrees |
| F | Fahrenheit |
| kW | kilowatt |
| lbs | pounds |
| hr | hour |

Example 1

Evaluation of Pan-to-Pan Uniformity

Ice melt tests were performed to evaluate the pan-to-pan uniformity of the steam cooker of the present design to three commercially available steam cookers: (1) a six pan Steam'N'Hold™ vacuum-capable connectionless steamer having a power input of 17 kW commercially available from AccuTemp Products, Inc., of Fort Wayne, Ind.; (2) a six pan Xtreme Steam™ connectionless steamer having a power input of 14 kW commercially available from Intek Manufacturing, LLC, of Fort Wayne, Ind.; and (3) a six pan Xtreme Steam™ connectionless steamer having a power input of 18 kW commercially available from Intek Manufacturing, LLC, of Fort Wayne, Ind. Steam'N'Hold and Xtreme Steam are a trademark of AccuTemp Products, Inc. of Fort Wayne, and Intek Manufacturing, LLC, of Fort Wayne, Ind., respectively.

The ice melt tests were performed in accordance with ASTM F1484-05, Standard Test Methods for Performance of Steam Cookers, available from ASTM International of West Conshohocken, Pa. Specifically, the ice melt tests were performed by freezing eight pounds of water in each of six different standard food pans containing thermocouples. Each of the empty steam cookers were brought up to temperature, i.e., 212° F. The steam cookers were then loaded with a full load of ice, i.e., six pans, and a timer was started. As the temperature in each of the pans begins to rise, it was monitored using the thermocouples. When the first pan in each of the steam cookers reached 170° F. the time that had elapsed was recorded. The time was also recorded when the last pan in each of the steam cookers reached 170° F. Additionally, when the last pan in each of the steam cookers reached 170° F., the temperature of each of the pans was also recorded.

The "cook time" for each of the steam cookers is the amount of time that elapsed after the six pans of ice were placed in the steamer until the last pan reached 170° F. In addition to cook time, two other measurements are used as a measure of pan-to-pan uniformity: (1) the difference in the temperature between the hottest pan and the coolest pan when the last pan in the steam cooker reached 170 and (2) the amount of time that elapsed after the first pan reached 170° F. until the last pan reached 170° F. The lower the measurements are, the better a given steam cooker has performed. The results of the ice load tests are set forth below in TABLE 2.

TABLE 2

| Ice Melt Test Results | | | | | |
| --- | --- | --- | --- | --- | --- |
| Steamer Model | Rated Power (kW) | Circulation Method | Cook Time (min) | Temperature Difference (° F.) | Time Difference (min) |
| Steam Cooker 10 | 17.0 | distributor/plenum | 18.1 | 20 | 1.7 |
| Steam'N'Hold ™ | 17.0 | vacuum | 19.2 | 35 | 6.8 |
| Xtreme Steam ™ | 14.0 | fan | 21.9 | 36.4 | 11.2 |
| Xtreme Steam ™ | 18.0 | fan | 17.8 | 34 | — |

Based in the results set forth in TABLE 2 above, the present design shows a clear improvement in pan-to-pan cooking uniformity. Specifically, the time difference between the first pan reaching 170° F. and the last pan reaching 170° F. was only 1.7 minutes for the present design, as compared to 6.8 minutes and 11.2 minutes for the other commercially available steam cookers. Similarly, the temperature difference between the hottest and coolest pans was 20° F. for the present design versus 34 to 36 degrees for commercially available steam cookers.

Example 2

Evaluation of the Cooking Productivity and Efficiency

A red potato cooking test was performed to evaluate the cooking productivity and efficiency of a steam cooker of the present design as compared to commercially available steam cookers. Specifically, a steam cooker of the present design was compared to the commercially available steam cookers identified above in Example 1.

Red potatoes are used to represent a food with a low surface area/volume ratio, which reduces condensation, decreases heat transfer, reduces productivity, and reduces cooking efficiency. The red potato test was performed in accordance with ASTM F1484-05, Standard Test Methods for Performance of Steam Cookers, available from ASTM International of West Conshohocken, Pa. Specifically, the red potato test uses a full load of pans, with each pan containing 8.0 lbs of red potatoes. The amount of time that it takes for the average potato temperature to reach 195° F. and the total energy used to achieve that average temperature are recorded. Cooking productivity, in terms of pounds per hour of cooked potatoes, and cooking energy efficiency are calculated from the results. The results of the red potato tests are set forth below in TABLE 3. As shown in TABLE 3, the cooking productivity of a steam cooker of the present design is comparable to commercially available steam cookers, with an acceptable level of energy or cooking efficiency.

TABLE 3

Red Potato Test Results

| Steamer Model | Rated Power (kW) | Circulation Method | Productivity (lbs/hr) | Cooking Efficiency |
|---|---|---|---|---|
| Steam Cooker 10 | 17.0 | Steam distributor | 132.5 | 62.3 |
| Steam'N'Hold ™ | 17.0 | vacuum | 132.8 | 69.6 |
| Xtreme Steam ™ | 14.0 | fan | 133.5 | 71.0 |
| Xtreme Steam ™ | 18.0 | fan | 137.6 | 64.4 |

Example 3

Single Serving Food Tests

In order to test the ability of a steam cooker of the present design to quickly heat single servings of food, a steam cooker of the present design was compared to a commercially available steam cooker, specifically, a six pan Steam'N'Hold™ vacuum-capable connectionless steamer having a power input of 17 kW commercially available from AccuTemp Products, Inc., of Fort Wayne, Ind.

Steam cookers are also commonly used to cook or warm small amounts, often single servings, of food. Many times a single serving is placed within a steam cooker and, before it is finished cooking, another serving is placed within the same steam cooker. In replicating this type of use, a small hole was drilled in one inch diameter nylon balls and a thermocouple was inserted into the hole so that the thermocouple extended into the center of the nylon ball. The nylon balls including the thermocouples were then placed in the center of three perforated hotel pans. The pans and nylon balls were then chilled to 0° F.

The steam cookers were then brought up to temperature, i.e., 212° F., and one of the pans having a nylon ball in the center thereof was loaded into the bottom position of each of the steam cookers. Two minutes later, another pan and ball were placed in the center of the steam cookers and, after two more minutes passed, another pan and ball were placed in the top of the steam cookers. The temperature at the center of the nylon balls were monitored throughout the tests. The time that elapsed after each nylon ball was placed in the steam cookers until the center of each nylon ball reach 195° F. was recorded.

The results of the test are set forth below in TABLE 4. As shown in TABLE 4, the steam cooker of the present design achieved significantly lower cooking time, which indicate a clear improvement in single serving cooking over commercially available steam cookers.

TABLE 4

Single Serving Food Test Results

| Steamer Model | Rated Power (kW) | Circulation Method | Elapsed time for ball in bottom pan to reach 195° F. (min) | Elapsed time for ball in middle pan to reach 195° F. (min) | Elapsed time for ball in top pan to reach 195° F. (min) |
|---|---|---|---|---|---|
| Steam Cooker 10 | 17.0 | Steam distributor | 5.5 | 6.8 | 8.8 |
| Steam'N'Hold ™ | 17.0 | Vacuum | 9.0 | 10.8 | 9.3 |

Example 4

Chamber Energy Loss Tests

The "Idle energy, Vent Rate" Table below, shown as TABLE 5, contains data collected in the steam cooker 10 of this disclosure with a pressure switch setting of 0.5 inches water column. The overall size of the steam cooker cavity tested was a cavity measuring approximately 14.1 inches in width by 21.3 inches in depth by 21.9 inches in height. As shown in TABLE 5, a smaller vent orifice results in less energy loss in the chamber.

TABLE 5

Idle energy, Vent Rate Test Results on Steam Cooker 10

| Test # | Vent Orifice diameter (in.) | Vented Steam (lb/hr) | Idle Energy (Whr) | Vent Energy (Whr) | Chamber losses (Whr) |
|---|---|---|---|---|---|
| 1 | 0.175 | 2.47 | 1037 | 709 | 328 |
| 2 | 0.305 | 4.00 | 1513 | 1149 | 364 |
| 3 | 0.250 | 3.25 | 1294 | 934 | 361 |

Example 5

Pressure Setting and Vent Size Tests

Figure 8:
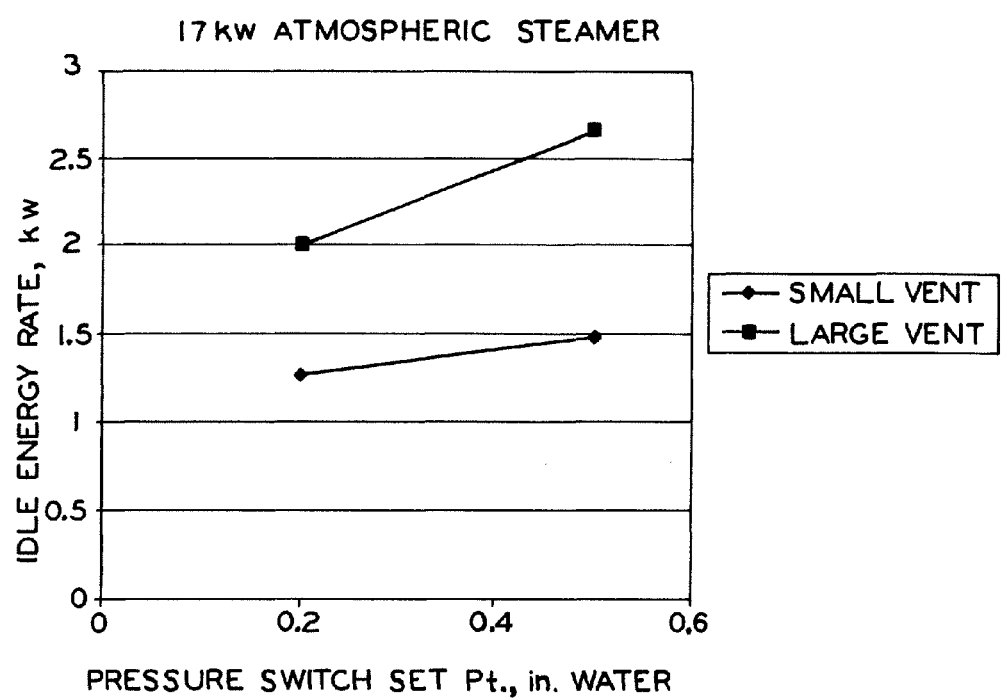
FIG. 8 is a graphical view of Idle energy v. Vent Size, Press Setting Test Results, containing data on both pressure settings and vent sizes.

The "Idle energy v. Vent Size, Press Setting" Table below, TABLE 6, and the graph illustrated in FIG. 8 contain data on both pressure settings and vent sizes. The overall size of the steamer cavity was a cavity measuring approximately 13.1 inches in width by 21.3 inches in depth by 21.3 inches in height. The idle energy rate is the amount of energy used when the steam cooker is idling in the ready to use cook mode. It is a reflection of how much steam is passing out the vent because, when idling, most of the energy losses are due to vented steam. As one can see from the below data, both vent size and pressure setting have an influence on vented steam.

Idle energy was measured by switching a clock on and off with the heaters. The steam cooker was first brought up to temperature, and then the clock was wired across solid state relays to run while the heaters ran. The steam cooker was run for 60 minutes. The power input to the steam cooker was measured to be 16.8 kW. Idle energy is equal to 16.8 multiplied by the clock time (time the heaters ran) divided by 60 minutes. The large vent was 13.5 inches in length of a copper (Cu) pipe measuring 0.5 inches in diameter. The small vent was the same with addition of a 0.25 inches close pipe nipple with an internal diameter of 0.35 inches. As shown in TABLE 6, the most Idle Energy is recorded with a higher pressure setting and a larger vent size.

TABLE 6

Idle energy v. Vent Size, Press Setting Test Results

| | Idle Energy | |
|---|---|---|
| Pressure Set point | Small Vent | Large Vent |
| 0.2 inches water column | 1.27 | 2.02 |
| 0.5 inches water column | 1.49 | 2.67 |

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A steam cooker, comprising:
    a cooking chamber defined by a plurality of walls, one of said plurality of walls including a vent orifice in fluid communication with said cooking chamber and an environment external to said cooking chamber;
    a steam collector including a solid upper surface and a side wall, said solid upper surface and side wall defining a steam chamber;
    a gap defined by said side wall and at least one of said plurality of walls of said cooking chamber;
    a quantity of water positioned within said gap and within said steam chamber, said quantity of water flowable between said gap and said steam chamber, said quantity of water forming a water seal between said steam chamber and said cooking chamber;
    a plenum in fluid communication with said steam chamber; and
    a steam distributor having a plurality of openings formed therein, said steam distributor cooperating with at least one of said plurality of walls of said cooking chamber to define said plenum,
        said side wall of said steam collector extending beyond a periphery of said upper surface of said steam collector to direct steam from said steam chamber defined by said steam collector to said plenum, whereby steam only exits the steam chamber via the plenum as steam in said steam chamber is directed through said plenum and out of said plurality of openings in said steam distributor.

2. The steam cooker of claim 1, wherein said side will includes a cutout, and wherein said quantity of water is flowable between said gap and said steam chamber via said cutout in said steam collector.

3. The steam cooker of claim 1, further comprising a pressure switch in fluid communication with said cooking chamber via a pressure orifice formed in one of said plurality of walls of said cooking chamber, said pressure switch positioned in an elevated position relative to said pressure orifice, whereby said elevated position allows gravitational forces to draw any formed condensate back into said cooking chamber.

4. The steam cooker of claim 3, further comprising a first tubing and a second tubing having different diameters, said first tubing adjacent to said pressure switch and said second tubing adjacent to said cooking chamber, said first tubing and said second tubing positioned in series to each other, and said pressure switch positioned on an exterior side wall of said steam cooker.

5. The steam cooker of claim 3, wherein the pressure switch activates to turn off one or more heaters at a preset pressure level, and wherein said preset pressure level is set for a range of about 0.2 inches water column to 3 inches water column.

6. The steam cooker of claim 3, wherein the pressure switch activates to turn off one or more heaters at a preset pressure level, and wherein said preset pressure level is set for 0.5 inches water column.

7. The steam cooker of claim 1, wherein said vent orifice has a diameter in a range of about 0.10 inches to 0.5 inches.

8. The steam cooker of claim 1, wherein said vent orifice has a diameter of 0.305 inches.

9. The steam cooker of claim 1, wherein at least one of said plurality of openings has a diameter in a range of about 0.110 inches to 0.260 inches.

10. The steam cooker of claim 1, wherein said cooking chamber includes a top surface and said plurality of openings are positioned in one or more horizontal rows corresponding to a maximum usable number of pans, said one or more horizontal rows comprising a top row adjacent to said top surface of said cooking chamber, a bottom row adjacent to said steam collector, and one or more middle rows positioned intermediate to said top row and said bottom row.

11. The steam cooker of claim 10, wherein a number of said plurality of openings for each horizontal row is four openings.

12. The steam cooker of claim 1, wherein said upper surface and said side wall of said steam collector are integral.

13. The steam cooker of claim 3, wherein said pressure orifice is fluidly connected to said pressure switch by a tube that extends away from said cooking chamber and then back toward said cooking chamber to form a continuous U-shape, said elevated position of said pressure switch together with the continuous U-shape of said tube allows gravitational forces to draw any formed condensate back into said cooking chamber.

14. The steam cooker of claim 3, wherein said pressure switch is positioned on an exterior side wall of said steam cooker adjacent to said cooking chamber, whereby a quantity of heat within said cooking chamber helps to keep any steam entering said pressure switch from condensing.

* * * * *